United States Patent
Imai et al.

(10) Patent No.: US 10,017,613 B2
(45) Date of Patent: Jul. 10, 2018

(54) METHOD OF PRODUCING CARBON FIBER-REINFORCED POLYARYLENE SULFIDE

(71) Applicant: Toray Industries, Inc., Tokyo (JP)

(72) Inventors: Naokichi Imai, Iyo-gun (JP); Kentaro Sano, Iyo-gun (JP); Keisuke Inose, Iyo-gun (JP)

(73) Assignee: Toray Industries, Inc. (JP)

( * ) Notice: Subject to any disclaimer, the term of this patent is extended or adjusted under 35 U.S.C. 154(b) by 204 days.

(21) Appl. No.: 15/032,145

(22) PCT Filed: Oct. 24, 2014

(86) PCT No.: PCT/JP2014/078290
§ 371 (c)(1),
(2) Date: Apr. 26, 2016

(87) PCT Pub. No.: WO2015/064484
PCT Pub. Date: May 7, 2015

(65) Prior Publication Data
US 2016/0257793 A1    Sep. 8, 2016

(30) Foreign Application Priority Data

Oct. 29, 2013  (JP) ................................ 2013-224169

(51) Int. Cl.
| | | |
|---|---|---|
| B29C 70/48 | (2006.01) |
| C08J 5/04 | (2006.01) |
| C08J 5/06 | (2006.01) |
| B29B 7/48 | (2006.01) |
| B29B 7/82 | (2006.01) |
| B29B 7/86 | (2006.01) |
| B29B 7/90 | (2006.01) |
| B29B 9/02 | (2006.01) |
| B29C 43/22 | (2006.01) |
| B29C 45/00 | (2006.01) |
| C08K 7/06 | (2006.01) |
| B29K 81/00 | (2006.01) |
| B29K 105/08 | (2006.01) |

(52) U.S. Cl.
CPC ............... *C08J 5/042* (2013.01); *B29B 7/482* (2013.01); *B29B 7/82* (2013.01); *B29B 7/86* (2013.01); *B29B 7/90* (2013.01); *B29B 9/02* (2013.01); *B29C 43/22* (2013.01); *B29C 45/0005* (2013.01); *C08J 5/06* (2013.01); *C08K 7/06* (2013.01); *B29K 2081/04* (2013.01); *B29K 2105/08* (2013.01); *C08J 2381/02* (2013.01); *C08J 2381/04* (2013.01); *C08J 2479/00* (2013.01)

(58) Field of Classification Search
CPC .... C08J 5/042; C08J 5/06; C08K 7/06; B29B 7/482; B29B 7/82; B29B 7/86; B29B 7/90; B29B 9/02; B29C 43/22; B29C 45/0005
See application file for complete search history.

(56) References Cited

U.S. PATENT DOCUMENTS 6,042,910 A * 3/2000 Kinouchi ................ C08L 81/02
                                                             428/35.7

FOREIGN PATENT DOCUMENTS

| JP | 05-086291 A | 4/1993 |
| JP | 05-156081 A | 6/1993 |
| JP | 08-059303 A | 3/1996 |
| JP | 08-225726 A | 9/1996 |
| JP | 10-273593 A | 10/1998 |
| JP | 2005-239917 A | 9/2005 |
| JP | 2009-173804 A | 8/2009 |
| JP | 2013-067746 A | 4/2013 |

* cited by examiner

*Primary Examiner* — Stella K Yi
(74) *Attorney, Agent, or Firm* — DLA Piper LLP (US)

(57) ABSTRACT

A carbon fiber-reinforced polyarylene sulfide has both dynamic characteristics and molding cycle characteristics and can be produced with high productivity by preparing a polycarbodiimide-modified polyarylene sulfide using a polyarylene sulfide and a polycarbodiimide as raw materials, then melting the resulting polycarbodiimide-modified polyarylene sulfide, and combining the polycarbodiimide-modified polyarylene sulfide with carbon fibers at a specific ratio to produce a composite.

18 Claims, No Drawings

METHOD OF PRODUCING CARBON FIBER-REINFORCED POLYARYLENE SULFIDE

TECHNICAL FIELD

This disclosure relates to a method of producing a carbon fiber-reinforced polyarylene sulfide having both dynamic characteristics and molding cycle characteristics with high productivity.

BACKGROUND

Fiber-reinforced composite materials including a thermoplastic resin and reinforcing fibers are easily molded and processed by virtue of the characteristics of the thermoplastic resin, and are excellent in recyclability. As these fiber-reinforced composite materials, molding materials in a variety of forms are known such as thermoplastic prepregs in which reinforcing fibers are arranged in the form of a sheet, and pellets in which reinforcing fibers are randomly dispersed. Fiber-reinforced composite materials are excellent in balance between lightness and dynamic characteristics, and are therefore widely used as structural members of aircraft, automobiles, watercraft and the like, electronic equipment housings, sporting goods, and industrial materials such as building materials.

Among thermoplastic resins, a polyarylene sulfide is particularly excellent in heat resistance and chemical resistance, and a fiber-reinforced polyarylene sulfide obtained by combining the polyarylene sulfide with reinforcing fibers can be expected to be applied to uses as an alternative to a metal material. However, in application of a fiber-reinforced polyarylene sulfide as an alternative to a metal material, further improvement of the dynamic characteristics, particularly the tensile strength of the fiber-reinforced polyarylene sulfide is desired. This is because the tensile elongation of a general polyarylene sulfide is lower than the tensile elongation of reinforcing fibers (e.g., about 2% in carbon fibers) and, therefore, the reinforcing effect of reinforcing fibers cannot be sufficiently utilized.

One means to improve the tensile strength of a fiber-reinforced polyarylene sulfide is enhancement of the elongation of a polyarylene sulfide to be used. However, the tensile elongation of a polyarylene sulfide correlates to its molecular weight and, hence, its melt viscosity, and when the tensile elongation of the polyarylene sulfide is improved, the melt viscosity increases so that it is difficult to combine the polyarylene sulfide with reinforcing fibers. Further, in this case, it is necessary to make the process temperature higher and, therefore, a polyarylene sulfide is not suitable to easily produce a fiber-reinforced polyarylene sulfide with high productivity. Accordingly, it is an important technical challenge to improve the tensile strength of a fiber-reinforced polyarylene sulfide while securing productivity.

Another means to improve the tensile strength of a fiber-reinforced polyarylene sulfide is modification using an additive. However, a general polyarylene sulfide has a melting point of about 285° C., which exceeds the average melting point of thermoplastic resins, and there is the problem that an additive is eluted (bleeds out or bleeds in other words) during molding processing of a fiber-reinforced polyarylene sulfide, leading to contamination of a molding die. To obtain a molded article excellent in external appearance quality, it is necessary to decontaminate the die on a regular basis and, therefore, in this case, there is the problem that molding cycle characteristics are considerably impaired.

For these reasons, it is an important technical challenge to improve the dynamic characteristics of a fiber-reinforced polyarylene sulfide while securing productivity during production and molding cycle characteristics during molding processing.

Japanese Patent Laid-open Publication No. 5-156081 discloses a carbon fiber-reinforced thermoplastic resin including carbon fibers, a thermoplastic resin and a carbodiimide reagent. However, JP '081 describes the use of a polyarylene sulfide in the specification, but does not disclose a means to control bleed-out during molding processing at a high temperature. A compound having only one carbodiimide group in one molecule is used as the carbodiimide reagent and since this additive is easily eluted from the carbon fiber-reinforced thermoplastic resin, bleed-out during molding processing of a fiber-reinforced polyarylene sulfide cannot be suppressed.

Japanese Patent Laid-open Publication No. 5-86291 discloses a resin composition containing a polyphenylene sulfide and a polycarbodiimide. JP '291 discloses a technique in which a polyphenylene sulfide and a polycarbodiimide are melt-kneaded to form a modified polyphenylene sulfide, and the use of reinforcing fibers such as carbon fibers, but it does not disclose means to control bleed-out of a polycarbodiimide during molding processing. Bleed-out during molding processing of a fiber-reinforced polyarylene sulfide cannot be suppressed and molding cycle characteristics during molding processing of a fiber-reinforced polyarylene sulfide are unsatisfactory.

Japanese Patent Laid-open Publication No. 10-273593 discloses a resin composition containing a polyarylene sulfide, an aliphatic polycarbodiimide-based resin and a filler, but as for a means to control bleed-out that causes die contamination during molding processing, it discloses only the added amount of the aliphatic polycarbodiimide-based resin, and does not disclose the degree of die contamination. Bleed-out during molding processing of a fiber-reinforced polyarylene sulfide cannot be sufficiently suppressed and molding cycle characteristics during molding processing of a fiber-reinforced polyarylene sulfide are unsatisfactory.

Japanese Patent Laid-open Publication No. 8-59303 discloses a reinforcing material surface-treated with a carbodiimide compound and a composite material produced using the reinforcing material, but does not show an example of using a polyarylene sulfide as a matrix resin, and does not disclose means for controlling bleed-out that causes die contamination during molding processing. Thus, bleed-out during molding processing of a fiber-reinforced polyarylene sulfide cannot be sufficiently suppressed and molding cycle characteristics during molding processing of a fiber-reinforced polyarylene sulfide are unsatisfactory.

It could therefore be helpful to provide a method of producing a carbon fiber-reinforced polyarylene sulfide, which can be inhibited from causing bleed-out during molding processing and has both dynamic characteristics and molding cycle characteristics, with high productivity.

SUMMARY

We found that by passing through specific production steps, a carbon fiber-reinforced polyarylene sulfide having both dynamic characteristics and molding cycle characteristics can be produced with high productivity.

We thus provide:

(1) A method of producing a carbon fiber-reinforced polyarylene sulfide, the method including the steps (I-1) to (III-1):

(I-1) mixing 100 parts by mass of a polyarylene sulfide (A) and 0.1 to 10 parts by mass of a polycarbodiimide (B) having at least two carbodiimide groups in one molecule, and heating, melt-kneading the resulting mixture to prepare a melt-kneaded product;

(II-1) heating the melt-kneaded product, which is prepared in the step (I-1), at a temperature equal to or higher than the glass transition temperature and equal to or lower than the melting point of the polyarylene sulfide (A) to accelerate reaction of the carbodiimide groups in the melt-kneaded product to prepare a polycarbodiimide-modified polyarylene sulfide (C-1); and (III-1) melting the polycarbodiimide-modified polyarylene sulfide (C-1) prepared in the step (II-1), and combining the polycarbodiimide-modified polyarylene sulfide (C-1) with 10 to 300 parts by mass of carbon fibers (D) based on 100 parts by mass of the polyarylene sulfide (A) to prepare a composite.

(2) A method of producing a carbon fiber-reinforced polyarylene sulfide, the method including the steps (I-2) to (III-2):

(I-2) heating a polycarbodiimide (B), which has at least two carbodiimide groups in one molecule, at a temperature equal to or higher than the softening point of the component (B) to accelerate reaction of the carbodiimide groups to prepare a polycarbodiimide reaction product (B-2);

(II-2) mixing 100 parts by mass of a polyarylene sulfide (A) and 0.1 to 10 parts by mass of the polycarbodiimide reaction product (B-2), and heating, melt-kneading the resulting mixture to prepare a polycarbodiimide-modified polyarylene sulfide (C-2); and (III-2) melting the polycarbodiimide-modified polyarylene sulfide (C-2) prepared in the step (II-2), and combining the polycarbodiimide-modified polyarylene sulfide (C-2) with 10 to 300 parts by mass of carbon fibers (D) based on 100 parts by mass of the polyarylene sulfide (A) to prepare a composite.

(3) A method of producing a carbon fiber-reinforced polyarylene sulfide, the method including the steps (I-3) to (III-3):

(I-3) preparing a mixture by mixing 100 parts by mass of a polyarylene sulfide (A) and 0.1 to 10 parts by mass of a polycarbodiimide (B) having at least two carbodiimide groups in one molecule;

(II-3) heating, melt-kneading the mixture, which is prepared in the step (I-3), at a temperature equal to or higher than the melting point of the polyarylene sulfide (A) to accelerate reaction of the carbodiimide groups to prepare a polycarbodiimide-modified polyarylene sulfide (C-3); and (III-3) melting the polycarbodiimide-modified polyarylene sulfide (C-3) at a temperature equal to or lower than the temperature during melt-kneading in the step (II-3), and combining the polycarbodiimide-modified polyarylene sulfide (C-3) with 10 to 300 parts by mass of carbon fibers (D) based on 100 parts by mass of the polyarylene sulfide (A) to prepare a composite.

A carbon fiber-reinforced polyarylene sulfide which can be inhibited from causing bleed-out during molding processing and has both dynamic characteristics and molding cycle characteristics can be produced with high productivity.

DETAILED DESCRIPTION

A first method of producing a carbon fiber-reinforced polyarylene sulfide according to one example includes steps (I-1) to (III-1). First, the steps (I-1) to (III-1) employed in the first production method will be described in detail.

Step (I-1)

The step (I-1) is a step of mixing a polyarylene sulfide (A) and a polycarbodiimide (B), and heating, melt-kneading the resulting mixture to prepare a melt-kneaded product.

The method of preparing the mixture in the step (I-1) may be, for example, a method in which the polyarylene sulfide (A) in the form of particles and the polycarbodiimide (B) in the form of particles are dry-blended for mixing the polyarylene sulfide (A) and the polycarbodiimide (B) as uniformly as possible. The apparatus to perform dry-blending may be, for example, a Henschel mixer, a rocking mixer or the like. The atmosphere in preparation of the mixture is preferably a non-oxidizing atmosphere, or an atmosphere under a reduced-pressure condition. The non-oxidizing atmosphere refers to an atmosphere in which the oxygen concentration in a gas phase in contact with the mixture is 5% by volume or less, preferably 2% by volume or less, further preferably substantially zero, i.e., an inert gas atmosphere of nitrogen, helium, argon or the like and, particularly, a nitrogen atmosphere is preferable from the viewpoint of economic efficiency and ease of handling in particular. It is preferable to use the above-mentioned mixing method because a reduction in reaction activity of the polyarylene sulfide (A) and the polycarbodiimide (B) is inhibited before next melt-kneading is performed.

The number average particle size of the polyarylene sulfide (A) and the polycarbodiimide (B) in dry-blending of the components is preferably 0.001 to 10 mm, more preferably 0.01 to 5 mm, further preferably 0.1 to 3 mm. The closer the number average particle sizes of the polyarylene sulfide (A) and the polycarbodiimide (B) are to each other, the more preferable. It is preferable that the number average particle size is in the above-mentioned range because separation in the kneaded product can be reduced.

The mixture in the step (I-1) is required to contain the polycarbodiimide (B) in an amount of 0.1 to 10 parts by mass, preferably 0.1 to 5 parts by mass based on 100 parts by mass of the polyarylene sulfide (A). When the content of the polycarbodiimide (B) is less than 0.1 part by mass, the amount of the polycarbodiimide (B) is not sufficient, and thus the effect of improving the dynamic characteristics of the resulting carbon fiber-reinforced polyarylene sulfide is not exhibited. When the content of the polycarbodiimide (B) is more than 10 parts by mass, conversely the amount of the polycarbodiimide (B) is excessively large, and thus the dynamic characteristics of the resulting carbon fiber-reinforced polyarylene sulfide are deteriorated.

The purpose of performing melt-kneading in the step (I-1) is as follows: the polyarylene sulfide (A) and the polycarbodiimide (B) are heated at a temperature not lower than the melting points thereof, thereby melt-kneaded under a melting condition to react functional groups of the polyarylene sulfide (A) with carbodiimide groups of the polycarbodiimide (B). The polycarbodiimide (B) is required to have at least two carbodiimide groups in one molecule. In a monocarbodiimide (B') having only one carbodiimide group in one molecule, an excessive amount of the monocarbodiimide (B') remains unreacted with the polyarylene sulfide (A) so that the molding cycle characteristics of the resulting carbon fiber-reinforced polyarylene sulfide are deteriorated.

The apparatus that performs melt-kneading in the step (I-1) may be, for example, a labo-plastomill mixer or an extruder. The labo-plastomill mixer is an apparatus in which a predetermined amount of a raw material is fed into a mixer, and melt-kneaded for a fixed time, and the melt-kneading time is easily controlled. The extruder is an apparatus in which a continuously fed raw material is conveyed and discharged while being melt-kneaded. The extruder is excellent in productivity of a melt-kneaded product.

The extruder to be used for melt-kneading in the step (I-1) may be, for example, a single-screw extruder or twin-screw extruder, and particularly, a twin-screw extruder excellent in melt-kneadability can be preferably used. The twin-screw extruder may be, for example, one in which the ratio of the screw length to the screw diameter (screw length)/(screw diameter) is 20 to 100. The screw of the twin-screw extruder is formed by combining screw segments having different lengths and shape features such as a full-flight and a kneading disc, and it is preferable that the screw includes one or more kneading discs for improvement of melt-kneadability and reactivity.

Further, it is preferable that at least a part of melt-kneading in the step (I-1) is performed under a reduced-pressure condition. A region to be placed under a reduced-pressure condition is preferably set to cover the whole melt-kneaded product in a labo-plastomill mixer, and is preferably set at a distance equivalent to a (screw length)/(screw diameter) ratio of 0 to 10 frontward from the position at which the melt-kneaded product is discharged in the case of using an extruder. The estimated pressure reduction degree in the region to be placed under the above-mentioned reduced-pressure condition is preferably −0.05 MPa or less, more preferably −0.08 MPa or less in terms of a gauge pressure. The gauge pressure here is a pressure reduction degree that is measured with the atmospheric pressure set to 0 MPa using a vacuum gauge. It is preferable that melt-kneading is performed under the above-mentioned reduced-pressure condition because easily volatile components such as thermally decomposed products of the polyarylene sulfide (A) and the polycarbodiimide (B) can be decreased so that the molding cycle characteristics of the resulting carbon fiber-reinforced polyarylene sulfide can be improved.

The temperature at which melt-kneading is performed in the step (I-1) is preferably 285 to 400° C., more preferably 285 to 350° C. When the temperature at which melt-kneading is performed is above the above-mentioned range, the polyarylene sulfide (A) and the polycarbodiimide (B) may be thermally decomposed to deteriorate the dynamic characteristics and molding cycle characteristics of the resulting carbon fiber-reinforced polyarylene sulfide. When the temperature at which melt-kneading is performed is below the above-mentioned range, a melt-kneaded product may not be obtained because the polyarylene sulfide (A) is not melted.

The time during which melt-kneading is performed in the step (I-1) is preferably 0.5 to 30 minutes, more preferably 0.5 to 15 minutes, further preferably 0.5 to 10 minutes, especially preferably 0.5 to 5 minutes. When the time during which melt-kneading is performed is above the above-mentioned range, the polyarylene sulfide (A) may be cross-linked to increase the viscosity, leading to difficulty in combination with the carbon fibers (D) in the step (III-1). When the time during which melt-kneading is performed is below the above-mentioned range, a melt-kneaded product may not be obtained because the polyarylene sulfide (A) and the polycarbodiimide (B) are not melted.

Where the time required until the polyarylene sulfide (A) and the polycarbodiimide (B) are completely melted after heating of the mixture is started is t1 (seconds) and the time required until the melt-kneaded product is taken out after the polyarylene sulfide (A) and the polycarbodiimide (B) are completely melted is t2 (seconds) in the step (I-1), it is preferable that t1 is smaller than t2. When this condition is satisfied, reaction of functional groups of the polyarylene sulfide (A) and carbodiimide groups of the polycarbodiimide (B) can be further improved. The time t1 here may be, for example, a time required until a part of the melt-kneaded product can be appropriately taken out to confirm that the polyarylene sulfide (A) and the polycarbodiimide (B) are melted after the mixture is fed into a mixer in the case of using a labo-plastomill mixer for melt-kneading in the step (I-1). The time t2 can be determined by subtracting the time t1 from the time required until taking out the melt-kneaded product after feeding the mixture into the mixer.

Step (II-1)

The step (II-1) is a step of heating the melt-kneaded product, which is prepared in the step (I-1), at a temperature equal to or higher than the glass transition temperature and equal to or lower than the melting point of the polyarylene sulfide (A) to accelerate reaction of the carbodiimide groups in the melt-kneaded product to prepare a polycarbodiimide-modified polyarylene sulfide (C-1).

The reaction of the carbodiimide groups in the melt-kneaded product here refers to the following reactions (1) and (2):

Reaction (1): reaction of functional groups of the polyarylene sulfide (A) with carbodiimide groups of the polycarbodiimide (B).

Reaction (2): carbodiimide groups of the polycarbodiimide (B) react with one another to form a dimer or a trimer, and the polycarbodiimide (B) forms a crosslinked structure.

Accordingly, the polycarbodiimide-modified polyarylene sulfide (C-1) may be, for example, one having a sea-island structure in which island phases including the polycarbodiimide (B) are dispersed in a sea phase including a reaction product of the polycarbodiimide (B) and the polyarylene sulfide (A), and further, a part or the whole of the polycarbodiimide (B) that forms the island phases is crosslinked through reaction (2). When the polycarbodiimide-modified polyarylene sulfide (C-1) has the above-mentioned structure, it can be expected that the polycarbodiimide (B) is hard to bleed out from the resulting carbon fiber-reinforced polyarylene sulfide.

The purpose of heating the melt-kneaded product, which is prepared in the step (I-1), at a temperature equal to or higher than the glass transition temperature and equal to or lower than the melting point of the polyarylene sulfide (A) in the step (II-1) is as follows: the reaction rate of each of reaction (1) and reaction (2) is improved while the crosslinking reaction of the polyarylene sulfide (A) itself is suppressed so that bleed-out of the polycarbodiimide (B) from the resulting carbon fiber-reinforced polyarylene sulfide is reduced. Particularly, since the polycarbodiimide (B) has at least two carbodiimide groups in one molecule, it can be expected that the polycarbodiimide (B) is hard to bleed out through reaction (2).

The method of heating the melt-kneaded product, which is prepared in the step (I-1), at a temperature equal to or higher than the glass transition temperature and equal to or lower than the melting point of the polyarylene sulfide (A) in the step (II-1) may be, for example, a method in which the melt-kneaded product prepared in the step (I-1) is transferred to a press molding machine in a molten state, and heated and pressed into a sheet, or a method in which the melt-kneaded product prepared in the step (I-1) is formed into a pellet, then transferred to an oven, and heated.

The temperature equal to or higher than the glass transition temperature and equal to or lower than the melting point of the polyarylene sulfide (A) in the step (II-1) may be, for example, 90 to 280° C., and is preferably 200 to 260° C. to improve the reaction rate of each of reaction (1) and reaction (2). The glass transition temperature and melting point of the polyarylene sulfide (A) can be determined using a differential scanning calorimeter (DSC).

The time during which the melt-kneaded product is heated at a temperature equal to or higher than the glass transition temperature and equal to or lower than the melting point of the polyarylene sulfide (A) in the step (II-1) is preferably 5 to 720 minutes, more preferably 20 to 360 minutes, further preferably 30 to 180 minutes. When the time during which the melt-kneaded product is heated is above the above-mentioned range, the polyarylene sulfide (A) may be cross-linked to increase the viscosity, thus making it difficult to combine the resulting polycarbodiimide-modified polyarylene sulfide (C-1) with carbon fibers (D) in the step (III-1). When the time during which the melt-kneaded product is heated is below the above-mentioned range, the reaction rate of each of reaction (1) and reaction (2) may be insufficient, leading to deterioration of the molding cycle characteristics of the resulting carbon fiber-reinforced polyarylene sulfide.

The atmosphere in which the melt-kneaded product is heated at a temperature equal to or higher than the glass transition temperature and equal to or lower than the melting point of the polyarylene sulfide (A) in the step (II-1) is preferably a non-oxidizing atmosphere, or an atmosphere under a reduced-pressure condition. The non-oxidizing atmosphere refers to an atmosphere in which the oxygen concentration in a gas phase in contact with the mixture is 5% by volume or less, preferably 2% by volume or less, further preferably substantially zero, i.e., an inert gas atmosphere of nitrogen, helium, argon or the like and, particularly, a nitrogen atmosphere is preferable from the viewpoint of economic efficiency and ease of handling in particular. When the melt-kneaded product is heated in the above-mentioned atmosphere, crosslinking of the polyarylene sulfide (A) itself is suppressed.

Step (III-1)

The step (III-1) is a step of melting the polycarbodiimide-modified polyarylene sulfide (C-1) prepared in the step (II-1), and combining the polycarbodiimide-modified polyarylene sulfide (C-1) with carbon fibers (D) to prepare a composite.

The amount of the carbon fibers (D) combined in the step (III-1) is required to be 10 to 300 parts by mass, preferably 10 to 200 parts by mass, more preferably 20 to 100 parts by mass, further preferably 20 to 50 parts by mass based on 100 parts by mass of the polyarylene sulfide (A). When the content of the carbon fibers (D) is less than 10 parts by mass, the amount of the carbon fibers (D) is not sufficient, and thus the effect of improving the dynamic characteristics of the resulting carbon fiber-reinforced polyarylene sulfide is not exhibited. When the content of the carbon fibers (D) is more than 300 parts by mass, it is difficult to combine the polycarbodiimide-modified polyarylene sulfide (C-1) with the carbon fibers (D), resulting in deterioration of the dynamic characteristics of the resulting carbon fiber-reinforced polyarylene sulfide.

The method of combining the polycarbodiimide-modified polyarylene sulfide (C-1) with the carbon fibers (D) in the step (III-1) may be, for example, a method in which a base material including the carbon fibers (D) as described later is impregnated with the melted polycarbodiimide-modified polyarylene sulfide (C-1), or a method in which the poly-carbodiimide-modified polyarylene sulfide (C-1) and the carbon fibers (D) are melt-kneaded using an extruder.

Further, the method of impregnating a base material composed of the carbon fibers (D), with the melted polycarbodiimide-modified polyarylene sulfide (C-1) in the step (III-1) may be, for example, a method in which the polycarbodiimide-modified polyarylene sulfide (C-1) processed into a sheet beforehand and the base material including the carbon fibers (D) are laminated, and heated and pressed using a press molding machine.

The temperature at which the polycarbodiimide-modified polyarylene sulfide (C-1) is melted in the step (III-1) is preferably 285 to 400° C., more preferably 285 to 350° C. When the temperature at which the polycarbodiimide-modified polyarylene sulfide (C-1) is melted is above the above-mentioned range, the polyarylene sulfide (A) and the polycarbodiimide (B) may be thermally decomposed to deteriorate the dynamic characteristics and molding cycle characteristics of the resulting carbon fiber-reinforced polyarylene sulfide. When the temperature at which the polycarbodiimide-modified polyarylene sulfide (C-1) is melted is below the above-mentioned range, a composite may not be obtained because the polycarbodiimide-modified polyarylene sulfide (C-1) is not melted.

The time required until the composite is prepared after the polycarbodiimide-modified polyarylene sulfide (C-1) is melted in the step (III-1) is preferably 1 to 120 minutes, more preferably 1 to 30 minutes, further preferably 1 to 10 minutes. When the time is in the above-mentioned range, the carbon fiber-reinforced polyarylene sulfide is produced with high productivity.

A second method of producing a carbon fiber-reinforced polyarylene sulfide according to one example includes steps (I-2) to (III-2). The steps (I-2) to (III-2) employed in the second production method will be described in detail.

Step (I-2)

The step (I-2) is a step of heating a polycarbodiimide (B), which has at least two carbodiimide groups in one molecule, at a temperature equal to or higher than the softening point of the component (B) to accelerate reaction of the carbodiimide groups to prepare a polycarbodiimide reaction product (B-2).

The reaction of carbodiimide groups refers to a reaction in which carbodiimide groups of the polycarbodiimide (B) react with one another to form a dimer or a trimer, and the polycarbodiimide (B) itself is polymerized to increase its molecular weight. The heat resistance of the polycarbodiimide reaction product (B-2) is improved with an increase in its molecular weight so that components that easily bleed out from the resulting carbon fiber-reinforced polyarylene sulfide are decreased.

The method of heating the polycarbodiimide (B) in the step (I-2) is preferably a method capable of heating a large amount of the polycarbodiimide (B) at a time, and examples thereof may include a method in which the polycarbodiimide (B) placed in a container is heated in an oven. When a large amount of the polycarbodiimide (B) is heated at a time, the polycarbodiimide reaction product (B-2) is produced with high productivity. Further, by using the polycarbodiimide reaction product (B-2), the heating time can be reduced in a step after the step (I-2), leading to excellent productivity of the carbon fiber-reinforced polyarylene sulfide.

In the step (I-2), the oven refers to an apparatus having a mechanism that heats the contents by heated air or radiant heat emitted from the wall surface of the inside of a furnace or a heat source, and examples thereof may include hot air ovens, vacuum ovens and electric furnaces. Among ovens, hot air ovens and vacuum ovens are preferably used because the temperature in the furnace is easily controlled, and excessive temperature elevation can be suppressed.

The atmosphere in heating of the polycarbodiimide (B) is preferably a non-oxidizing atmosphere, or an atmosphere under a reduced-pressure condition. The non-oxidizing atmosphere refers to an atmosphere in which the oxygen concentration in a gas phase in contact with the polycarbodiimide (B) and the polycarbodiimide reaction product (B-2) is 5% by volume or less, preferably 2% by volume or less, further preferably substantially zero, i.e., an inert gas atmosphere of nitrogen, helium, argon or the like and, particularly, a nitrogen atmosphere is preferable from the viewpoint of economic efficiency and ease of handling in particular. In an atmosphere under a reduced-pressure condition, the estimated pressure reduction degree is preferably −0.05 MPa or less, more preferably −0.08 MPa or less in terms of a gauge pressure. The gauge pressure here is a pressure reduction degree that is measured with the atmospheric pressure set to 0 MPa using a vacuum gauge. It is preferable that heating is performed under the above-mentioned condition because oxidation and thermal decomposition of the polycarbodiimide (B) and the polycarbodiimide reaction product (B-2) can be suppressed so that the dynamic characteristics and molding cycle characteristics of the resulting carbon fiber-reinforced polyarylene sulfide can be improved.

The temperature equal to or higher than the softening point of the polycarbodiimide (B) in the step (I-2) may be, for example, 50 to 250° C. The temperature at which the polycarbodiimide (B) is heated in the step (I-2) is more preferably 70 to 250° C., further preferably 100 to 150° C. When the temperature at which the polycarbodiimide (B) is heated is in the above-mentioned range, structures formed by reaction of carbodiimide groups and unreacted carbodiimide groups coexist in the polycarbodiimide reaction product (B-2) so that the dynamic characteristics and molding cycle characteristics of the resulting carbon fiber-reinforced polyarylene sulfide can be improved. The softening point of the polycarbodiimide (B) can be determined using a thermomechanical analyzer (TMA).

The time during which the polycarbodiimide (B) is heated in the step (I-2) is preferably 1 to 48 hours, more preferably 2 to 30 hours, further preferably 3 to 24 hours. When the time during which the polycarbodiimide (B) is heated is above the above-mentioned range, the dynamic characteristics of the resulting carbon fiber-reinforced polyarylene sulfide may not be improved because the number of unreacted carbodiimide groups in the polycarbodiimide reaction product (B-2) is small. When the time during which the polycarbodiimide (B) is heated is below the above-mentioned range, the molding cycle characteristics of the resulting carbon fiber-reinforced polyarylene sulfide may not be improved because the number of structures formed by reaction of carbodiimide groups is small.

To prepare the polycarbodiimide reaction product (B-2) in the step (I-2), it is necessary to use the polycarbodiimide (B) having at least two carbodiimide groups in one molecule. In the monocarbodiimide (B') having only one carbodiimide group in one molecule, reaction of carbodiimide groups cannot cause polymerization to proceed, and it is thus unable to increase the molecular weight so that the heat resistance improving effect is small. Further, carbodiimide groups do not remain in a reaction product obtained by reaction of carbodiimide groups of the monocarbodiimide (B'). Accordingly, when a reaction product obtained by reaction of carbodiimide groups of the monocarbodiimide (B') is used, both the effect of improving the dynamic characteristics and the molding cycle characteristics of the resulting carbon fiber-reinforced polyarylene sulfide cannot be secured.

Step (II-2)

The step (II-2) is a step of mixing 100 parts by mass of a polyarylene sulfide (A) and 0.1 to 10 parts by mass of the polycarbodiimide reaction product (B-2) prepared in the step (I-2), and heating, melt-kneading the resulting mixture to prepare a polycarbodiimide-modified polyarylene sulfide (C-2).

The method of preparing the mixture in the step (II-2) may be, for example, a method in which the polyarylene sulfide (A) in the form of particles and the polycarbodiimide reaction product (B-2) in the form of particles are dry-blended to mix the polyarylene sulfide (A) and the polycarbodiimide reaction product (B-2) as uniformly as possible. The apparatus that performs dry-blending may be, for example, a Henschel mixer, a rocking mixer or the like. The atmosphere in preparation of the mixture is preferably a non-oxidizing atmosphere, or an atmosphere under a reduced-pressure condition. The non-oxidizing atmosphere refers to an atmosphere in which the oxygen concentration in a gas phase in contact with the mixture is 5% by volume or less, preferably 2% by volume or less, further preferably substantially zero, i.e., an inert gas atmosphere of nitrogen, helium, argon or the like and, particularly, a nitrogen atmosphere is preferable from the viewpoint of economic efficiency and ease of handling in particular. It is preferable to use the above-mentioned mixing method because a reduction in reaction activity of the polyarylene sulfide (A) and the polycarbodiimide reaction product (B-2) is inhibited before next melt-kneading is performed.

The number average particle size of the polyarylene sulfide (A) and the polycarbodiimide reaction product (B-2) in dry-blending of the components is preferably 0.001 to 10 mm, more preferably 0.01 to 5 mm, further preferably 0.1 to 3 mm. The closer the number average particle sizes of the polyarylene sulfide (A) and the polycarbodiimide reaction product (B-2) are to each other, the more preferable. It is preferable that the number average particle size is in the above-mentioned range because separation in the kneaded product can be reduced.

The mixture in the step (II-2) is required to contain the polycarbodiimide reaction product (B-2) in an amount of 0.1 to 10 parts by mass, preferably 0.1 to 5 parts by mass based on 100 parts by mass of the polyarylene sulfide (A). When the content of the polycarbodiimide reaction product (B-2) is less than 0.1 part by mass, the amount of the polycarbodiimide reaction product (B-2) is not sufficient, and thus the effect of improving the dynamic characteristics of the resulting carbon fiber-reinforced polyarylene sulfide is not exhibited. When the content of the polycarbodiimide reaction product (B-2) is more than 10 parts by mass, conversely the amount of the polycarbodiimide reaction product (B-2) is excessively large, and thus the dynamic characteristics of the resulting carbon fiber-reinforced polyarylene sulfide are deteriorated.

The purpose of performing melt-kneading in the step (II-2) is as follows: the polyarylene sulfide (A) is heated at a temperature equal to or higher than the melting point thereof, thereby melt-kneaded with the polycarbodiimide reaction product (B-2) under a melting condition of the polyarylene sulfide (A), whereby functional groups of the polyarylene sulfide (A) are reacted with carbodiimide groups of the polycarbodiimide reaction product (B-2) to prepare the polycarbodiimide-modified polyarylene sulfide (C-2). In this way, the dynamic characteristics of the resulting carbon fiber-reinforced polyarylene sulfide can be improved while the molding cycle characteristics of the carbon fiber-reinforced polyarylene sulfide are secured.

The apparatus that performs melt-kneading in the step (II-2) may be, for example, a labo-plastomill mixer or an extruder. The labo-plastomill mixer is an apparatus in which a predetermined amount of a raw material is fed into a mixer, and melt-kneaded for a fixed time, and the melt-kneading time is easily controlled. The extruder is an apparatus in which a continuously fed raw material is conveyed and discharged while being melt-kneaded. The extruder is excellent in productivity of a melt-kneaded product.

The extruder to be used for melt-kneading in the step (II-2) may be, for example, a single-screw extruder or twin-screw extruder and, particularly, a twin-screw extruder excellent in melt-kneadability can be preferably used. The twin-screw extruder may be, for example, one in which the ratio of the screw length to the screw diameter (screw length)/(screw diameter) is 20 to 100. The screw of the twin-screw extruder is formed by combining screw segments having different lengths and shape features such as a full-flight and a kneading disc, and it is preferable that the screw includes one or more kneading discs for improvement of melt-kneadability and reactivity.

Further, it is preferable that at least a part of melt-kneading in the step (II-2) is performed under a reduced-pressure condition. A region to be placed under a reduced-pressure condition is preferably set to cover the whole melt-kneaded product in using a labo-plastomill mixer, and is preferably set at a distance equivalent to a (screw length)/(screw diameter) ratio of 0 to 10 frontward from the position at which the melt-kneaded product is discharged in the case of using an extruder. The estimated pressure reduction degree in the region to be placed under the above-mentioned reduced-pressure condition is preferably −0.05 MPa or less, more preferably −0.08 MPa or less in terms of a gauge pressure. The gauge pressure here is a pressure reduction degree measured with the atmospheric pressure set to 0 MPa using a vacuum gauge. It is preferable that melt-kneading is performed under such a reduced-pressure condition because easily volatile components such as thermally decomposed products of the polyarylene sulfide (A) and the polycarbodiimide reaction product (B-2) can be decreased so that the molding cycle characteristics of the resulting carbon fiber-reinforced polyarylene sulfide can be improved.

The temperature at which melt-kneading is performed in the step (II-2) is preferably 285 to 400° C., more preferably 285 to 350° C. When the temperature at which melt-kneading is performed is above the above-mentioned range, the polyarylene sulfide (A) and the polycarbodiimide reaction product (B-2) may be thermally decomposed to deteriorate the dynamic characteristics and molding cycle characteristics of the resulting carbon fiber-reinforced polyarylene sulfide. When the temperature at which melt-kneading is performed is below the above-mentioned range, a melt-kneaded product may not be obtained because the polyarylene sulfide (A) is not melted.

The time during which melt-kneading is performed in the step (II-2) is preferably 0.5 to 30 minutes, more preferably 0.5 to 15 minutes, further preferably 0.5 to 10 minutes, especially preferably 0.5 to 5 minutes. When the time during which melt-kneading is performed is above the above-mentioned range, the polyarylene sulfide (A) may be cross-linked to increase the viscosity, thus making it difficult to combine the resulting polycarbodiimide-modified polyarylene sulfide (C-3) with carbon fibers (D) in the step (III-3). When the time during which melt-kneading is performed is below the above-mentioned range, a melt-kneaded product may not be obtained because the polyarylene sulfide (A) is not melted.

It is preferable that in the step (II-2), the polycarbodiimide-modified polyarylene sulfide (C-2) is processed into a sheet by a method in which after melt-kneading, the melt-kneaded product is transferred to a press molding machine in a molten state, and heated and pressed into a sheet, or a method in which the melt-kneaded product is discharged in the form of a sheet from a T die or slit die mounted at the head of a twin-screw extruder.

Step (III-2)

The step (III-2) is a step of melting the polycarbodiimide-modified polyarylene sulfide (C-2) prepared in the step (II-2), and combining the polycarbodiimide-modified polyarylene sulfide (C-2) with 10 to 300 parts by mass of carbon fibers (D) based on 100 parts by mass of the polyarylene sulfide (A) to prepare a composite.

In the step (III-2), the amount of the carbon fibers (D) to be combined is required to be 10 to 300 parts by mass, preferably 10 to 200 parts by mass, more preferably 20 to 100 parts by mass, further preferably 20 to 50 parts by mass based on 100 parts by mass of the polyarylene sulfide (A). When the content of the carbon fibers (D) is less than 10 parts by mass, the amount of the carbon fibers (D) is not sufficient, and thus the effect of improving the dynamic characteristics of the resulting carbon fiber-reinforced polyarylene sulfide is not exhibited. When the content of the carbon fibers (D) is more than 300 parts by mass, it is difficult to combine the polycarbodiimide-modified polyarylene sulfide (C-2) with the carbon fibers (D), resulting in deterioration of the dynamic characteristics of the resulting carbon fiber-reinforced polyarylene sulfide.

The method of combining the polycarbodiimide-modified polyarylene sulfide (C-2) with the carbon fibers (D) in the step (III-2) may be, for example, a method in which a base material including the carbon fibers (D) as described later is impregnated with the melted polycarbodiimide-modified polyarylene sulfide (C-2), or a method in which the polycarbodiimide-modified polyarylene sulfide (C-2) and the carbon fibers (D) are melt-kneaded using an extruder.

Further, the method of impregnating a base material composed of the carbon fibers (D), with the melted polycarbodiimide-modified polyarylene sulfide (C-2) in the step (III-2) may be, for example, a method in which the polycarbodiimide-modified polyarylene sulfide (C-2) processed into a sheet beforehand and the base material including the carbon fibers (D) are laminated, and heated and pressed using a press molding machine.

The temperature at which the polycarbodiimide-modified polyarylene sulfide (C-2) is melted in the step (III-2) is preferably 285 to 400° C., more preferably 285 to 350° C. When the temperature at which the polycarbodiimide-modified polyarylene sulfide (C-2) is melted is above the above-mentioned range, the polyarylene sulfide (A) and the polycarbodiimide reaction product (B-2) may be thermally decomposed to deteriorate the dynamic characteristics and molding cycle characteristics of the resulting carbon fiber-reinforced polyarylene sulfide. When the temperature at which the polycarbodiimide-modified polyarylene sulfide (C-2) is melted is below the above-mentioned range, a composite may not be obtained because the polycarbodiimide-modified polyarylene sulfide (C-2) is not melted.

The time required until the composite is prepared after the polycarbodiimide-modified polyarylene sulfide (C-2) is melted in the step (III-2) is preferably 1 to 120 minutes, more preferably 1 to 30 minutes, further preferably 1 to 10 minutes. When the time is in the above-mentioned range, the carbon fiber-reinforced polyarylene sulfide is produced with high productivity.

A third method of producing a carbon fiber-reinforced polyarylene sulfide according to one example includes steps (I-3) to (III-3). The steps (I-3) to (III-3) employed in the third production method will be described in detail.

Step (I-3)

The step (I-3) is a step of preparing a mixture by mixing 100 parts by mass of a polyarylene sulfide (A) and 0.1 to 10 parts by mass of a polycarbodiimide (B) having at least two carbodiimide groups in one molecule.

The method of preparing the mixture in the step (I-3) may be, for example, a method in which the polyarylene sulfide (A) in the form of particles and the polycarbodiimide (B) in the form of particles are dry-blended for mixing the polyarylene sulfide (A) and the polycarbodiimide (B) as uniformly as possible. The apparatus that performs dry-blending may be, for example, a Henschel mixer, a rocking mixer or the like. The atmosphere in preparation of the mixture is preferably a non-oxidizing atmosphere, or an atmosphere under a reduced-pressure condition. The non-oxidizing atmosphere refers to an atmosphere in which the oxygen concentration in a gas phase in contact with the mixture is 5% by volume or less, preferably 2% by volume or less, further preferably substantially zero, i.e., an inert gas atmosphere of nitrogen, helium, argon or the like and, particularly, a nitrogen atmosphere is preferable from the viewpoint of economic efficiency and ease of handling in particular. It is preferable to use the above-mentioned mixing method because a reduction in reaction activity of the polyarylene sulfide (A) and the polycarbodiimide (B) is inhibited before next melt-kneading is performed.

The number average particle size of the polyarylene sulfide (A) and the polycarbodiimide (B) in dry-blending of the components is preferably 0.001 to 10 mm, more preferably 0.01 to 5 mm, further preferably 0.1 to 3 mm. The closer the number average particle sizes of the polyarylene sulfide (A) and the polycarbodiimide (B) are to each other, the more preferable. It is preferable that the number average particle size is in the above-mentioned range because separation in the kneaded product can be reduced.

The mixture in the step (I-3) is required to contain the polycarbodiimide (B) in an amount of 0.1 to 10 parts by mass, preferably 0.1 to 5 parts by mass based on 100 parts by mass of the polyarylene sulfide (A). When the content of the polycarbodiimide (B) is less than 0.1 part by mass, the amount of the polycarbodiimide (B) is not sufficient, and thus the effect of improving the dynamic characteristics of the resulting carbon fiber-reinforced polyarylene sulfide is not exhibited. When the content of the polycarbodiimide (B) is more than 10 parts by mass, conversely the amount of the polycarbodiimide (B) is excessively large, and thus the dynamic characteristics of the resulting carbon fiber-reinforced polyarylene sulfide are deteriorated.

Step (II-3)

The step (II-3) is a step of heating, melt-kneading the mixture, which is prepared in the step (I-3), at a temperature equal to or higher than the melting point of the polyarylene sulfide (A) to accelerate reaction of the carbodiimide groups to prepare a polycarbodiimide-modified polyarylene sulfide (C-3).

The reaction of carbodiimide groups which can be accelerated by heating, melt-kneading the mixture, which is prepared in the step (I-3), at a temperature equal to or higher than the melting point of the polyarylene sulfide (A) in the step (II-3) refers to a reaction of functional groups of the polyarylene sulfide (A) with carbodiimide groups of the polycarbodiimide (B) and a reaction in which carbodiimide groups of the polycarbodiimide (B) react with one another to form a dimer or a trimer, and the polycarbodiimide (B) forms a crosslinked structure.

Accordingly, the polycarbodiimide-modified polyarylene sulfide (C-3) may be, for example, one having a sea-island structure in which island phases including the polycarbodiimide (B) are dispersed in a sea phase including a reaction product of the polycarbodiimide (B) and the polyarylene sulfide (A), and further, a part or the whole of the polycarbodiimide (B) that forms the island phases is crosslinked through the reaction of carbodiimide groups of the polycarbodiimide (B). When the polycarbodiimide-modified polyarylene sulfide (C-3) has the above-mentioned structure, it can be expected that the polycarbodiimide (B) is hard to bleed out from the resulting carbon fiber-reinforced polyarylene sulfide. Particularly, since the polycarbodiimide (B) has at least two carbodiimide groups in one molecule, it can be expected that the polycarbodiimide (B) is hard to bleed out through the reaction in which carbodiimide groups react with one another to form a dimer or a trimer. In a monocarbodiimide (B') having only one carbodiimide group in one molecule, an excessive amount of the monocarbodiimide (B') remains unreacted with the polyarylene sulfide so that the molding cycle characteristics of the resulting carbon fiber-reinforced polyarylene sulfide are deteriorated.

The apparatus that performs melt-kneading in the step (II-3) may be, for example, a labo-plastomill mixer or an extruder. The labo-plastomill mixer is an apparatus in which a predetermined amount of a raw material is fed into a mixer, and melt-kneaded for a fixed time, and the melt-kneading time is easily controlled. The extruder is an apparatus in which a continuously fed raw material is conveyed and discharged while being melt-kneaded. The extruder is excellent in productivity of a melt-kneaded product.

The extruder to be used for melt-kneading in the step (II-3) may be, for example, a single-screw extruder or twin-screw extruder and, particularly, a twin-screw extruder excellent in melt-kneadability can be preferably used. The twin-screw extruder may be, for example, one in which the ratio of the screw length to the screw diameter (screw length)/(screw diameter) is 20 to 100. The screw of the twin-screw extruder is formed by combining screw segments having different lengths and shape features such as a full-flight and a kneading disc, and it is preferable that the screw includes one or more kneading discs for improvement of melt-kneadability and reactivity.

Further, it is preferable that at least a part of melt-kneading in the step (II-3) is performed under a reduced-pressure condition. A region to be placed under a reduced-pressure condition is preferably set to cover the whole melt-kneaded product in using a labo-plastomill mixer, and is preferably set at a distance equivalent to a (screw length)/(screw diameter) ratio of 0 to 10 frontward from the position at which the melt-kneaded product is discharged in using an extruder. The estimated pressure reduction degree in the region to be placed under the above-mentioned reduced-pressure condition is preferably $-0.05$ MPa or less, more preferably $-0.08$ MPa or less in terms of a gauge pressure. The gauge pressure here is a pressure reduction degree measured with the atmospheric pressure set to 0 MPa using a vacuum gauge. It is preferable that melt-kneading is performed under the above-mentioned reduced-pressure condition because easily volatile components such as thermally decomposed products of the polyarylene sulfide (A) and the polycarbodiimide (B) can be decreased so that the molding cycle characteristics of the resulting carbon fiber-reinforced polyarylene sulfide can be improved.

In the step (II-3), the temperature equal to or higher than the melting point of the component (A), i.e., the temperature at which the polycarbodiimide-modified polyarylene sulfide (C-3) is prepared by melt-kneading is preferably 330 to 400° C., more preferably 330 to 360° C. When melt-kneading is performed at 330° C. or higher, reaction of the polyarylene sulfide (A) with the polycarbodiimide (B) can be carried out in a short time, leading to excellent productivity of the polycarbodiimide-modified polyarylene sulfide (C-3). When the temperature at which melt-kneading is performed is above the above-mentioned range, the polyarylene sulfide (A) and the polycarbodiimide (B) may be thermally decomposed to deteriorate the dynamic characteristics and molding cycle characteristics of the resulting carbon fiber-reinforced polyarylene sulfide.

The time during which melt-kneading is performed in the step (II-3) is preferably 0.5 to 30 minutes, more preferably 0.5 to 15 minutes, further preferably 0.5 to 10 minutes, especially preferably 0.5 to 5 minutes. When the time during which melt-kneading is performed is above the above-mentioned range, the polyarylene sulfide (A) may be cross-linked to increase the viscosity, thus making it difficult to combine the resulting polycarbodiimide-modified polyarylene sulfide (C-3) with carbon fibers (D) in the step (III-3). When the time during which melt-kneading is performed is below the above-mentioned range, a melt-kneaded product may not be obtained because the polyarylene sulfide (A) and the polycarbodiimide (B) are not melted.

It is preferable that in the step (II-3), the polycarbodiimide-modified polyarylene sulfide (C-3) is processed into a sheet by a method in which after melt-kneading, the melt-kneaded product is transferred to a press molding machine in a molten state, and heated and pressed into a sheet, or a method in which the melt-kneaded product is discharged in the form of a sheet from a T die or slit die mounted at the head of a twin-screw extruder.

Step (III-3)

The step (III-3) is a step of melting the polycarbodiimide-modified polyarylene sulfide (C-3) at a temperature equal to or lower than the temperature during melt-kneading in the step (II-3), and combining the polycarbodiimide-modified polyarylene sulfide (C-3) with 10 to 300 parts by mass of carbon fibers (D) based on 100 parts by mass of the polyarylene sulfide (A) to prepare a composite.

When the temperature at which the polycarbodiimide-modified polyarylene sulfide (C-3) is melted in the step (III-3) is equal to or lower than the temperature during melt-kneading in the step (II-3), generation of volatile components resulting from thermal decomposition of the polycarbodiimide-modified polyarylene sulfide (C-3) and the like can be suppressed in combination with the carbon fibers (D). Further, volatile components generated during combination can be decreased so that adhesion between the polycarbodiimide-modified polyarylene sulfide (C-3) and the reinforcing fibers (D) can be improved. For these reasons, the dynamic characteristics of the resulting carbon fiber-reinforced polyarylene sulfide can be improved while the molding cycle characteristics of the carbon fiber-reinforced polyarylene sulfide are secured.

Further, in the step (III-3), the temperature equal to or lower than the temperature during melt-kneading, i.e., the temperature at which the polycarbodiimide-modified polyarylene sulfide (C-3) is melted in the step (II-3) is preferably 280 to 330° C., more preferably 280 to 300° C. When the temperature at which the polycarbodiimide-modified polyarylene sulfide (C-3) is melted is above the above-mentioned range, the dynamic characteristics and molding cycle characteristics of the resulting carbon fiber-reinforced polyarylene sulfide may be deteriorated due to thermal decomposition of the polycarbodiimide-modified polyarylene sulfide (C-3). When the temperature at which the polycarbodiimide-modified polyarylene sulfide (C-3) is melted is below the above-mentioned range, a composite may not be obtained because the polycarbodiimide-modified polyarylene sulfide (C-3) is not melted.

The time required until the composite is prepared after the polycarbodiimide-modified polyarylene sulfide (C-3) is melted in the step (III-3) is preferably 1 to 120 minutes, more preferably 1 to 30 minutes, further preferably 1 to 10 minutes. When the time is in the above-mentioned range, the carbon fiber-reinforced polyarylene sulfide is produced with high productivity.

The amount of the carbon fibers (D) that is combined in the step (III-3) is required to be 10 to 300 parts by mass, preferably 10 to 200 parts by mass, more preferably 20 to 100 parts by mass, further preferably 20 to 50 parts by mass based on 100 parts by mass of the polyarylene sulfide (A). When the content of the carbon fibers (D) is less than 10 parts by mass, the amount of the carbon fibers (D) is not sufficient, and thus the effect of improving the dynamic characteristics of the resulting carbon fiber-reinforced polyarylene sulfide is not exhibited. When the content of the carbon fibers (D) is more than 300 parts by mass, it is difficult to combine the polycarbodiimide-modified polyarylene sulfide (C-3) with the carbon fibers (D), resulting in deterioration of the dynamic characteristics of the resulting carbon fiber-reinforced polyarylene sulfide.

The method of combining the polycarbodiimide-modified polyarylene sulfide (C-3) with the carbon fibers (D) in the step (III-3) may be, for example, a method in which a base material including the carbon fibers (D) as described later is impregnated with the melted polycarbodiimide-modified polyarylene sulfide (C-3), or a method in which the polycarbodiimide-modified polyarylene sulfide (C-3) and the carbon fibers (D) are melt-kneaded using an extruder.

Further, the method of impregnating a base material, which is composed of the carbon fibers (D), with the melted polycarbodiimide-modified polyarylene sulfide (C-3) in the step (III-3) may be, for example, a method in which the polycarbodiimide-modified polyarylene sulfide (C-3) processed into a sheet beforehand and the base material including the carbon fibers (D) are laminated, and heated and pressed using a press molding machine.

Base Material Including Carbon Fibers (D)

Examples of the base material including the carbon fibers (D) include unidirectionally arranged base materials in which continuous carbon fibers (D) are unidirectionally arranged to form a sheet, woven fabrics (cloths), nonwoven fabrics, knitted fabrics, braids, yarns and tows. Among them, base materials including carbon fibers (D) in the form of a nonwoven fabric which are relatively easily impregnated with the polycarbodiimide-modified polyarylene sulfide (C-1), (C-2) or (C-3) are preferably used. Preferably, the carbon fibers (D) in the form of a nonwoven fabric include randomly dispersed carbon fiber monofilaments, and the fiber length of the carbon fiber (D) monofilaments is preferably 0.01 to 20 mm, more preferably 0.01 to 10 mm in terms of a number average fiber length. When the fiber length of the carbon fiber (D) monofilaments is in the above-mentioned range, a carbon fiber-reinforced polyarylene sulfide excellent in dynamic characteristics and fluidity during molding processing is obtained. The dynamic characteristics of the resulting polycarbodiimide-modified polyarylene sulfide are improved as the fiber length of the carbon fibers (D) increases.

Step (IV)

Preferably, each of the production methods further includes the following step (IV). The step (IV) is a step of heating the composite, which is prepared in the step (III-1), (III-2) or (III-3), at a temperature equal to or higher than the glass transition temperature and equal to or lower than the melting point of the polyarylene sulfide (A) to accelerate reaction of the carbodiimide groups in the composite.

By passing through the step (IV), the reaction rate of each of the reaction of functional groups of the polyarylene sulfide (A) with carbodiimide groups of the polycarbodiimide (B) and the reaction in which carbodiimide groups of the polycarbodiimide (B) react with one another to form a dimer or a trimer, and the polycarbodiimide (B) forms a crosslinked structure in the step (II-1), (I-2), (II-2) or (II-3) can be further improved, and bleed-out of the polyarylene sulfide (B) from the resulting carbon fiber-reinforced polyarylene sulfide can be reduced.

The temperature equal to or higher than the glass transition temperature and equal to or lower than the melting point of the polyarylene sulfide (A) may be, for example, 90 to 280° C., and is preferably 200 to 260° C. to improve the reaction rate of each of the reaction of functional groups of the polyarylene sulfide (A) with carbodiimide groups of the polycarbodiimide (B) and the reaction in which carbodiimide groups of the polycarbodiimide (B) react with one another to form a dimer or a trimer, and the polycarbodiimide (B) forms a crosslinked structure. The glass transition temperature and melting point of the polyarylene sulfide (A) can be determined using a differential scanning calorimeter (DSC).

The time during which the melt-kneaded product is heated at a temperature equal to or higher than the glass transition temperature and equal to or lower than the melting point of the polyarylene sulfide (A) in the step (IV) is preferably 5 to 720 minutes, more preferably 20 to 360 minutes, further preferably 30 to 180 minutes. When the time during which the melt-kneaded product is heated is above the above-mentioned range, the polyarylene sulfide (A) may be cross-linked to increase the viscosity, leading to difficulty in further heat molding processing.

Step (V)

Preferably, each of the production methods further includes the following step (V). The step (V) is a step of injection-molding or press-molding the composite prepared in the step (III-1), (III-2) or (III-3) or the composite subjected to the step (IV).

As injection molding in the step (V), mention may be made of, for example, a method using an in-line screw-type injection molding machine, specifically a method in which a composite is metered into a cylinder of an injection molding machine to be melted, and the molten composite is then injected into a molding die, cooled and solidified, and then taken out as an injection-molded article having a predetermined shape.

As press molding in the step (V), mention may be made of, for example, a method in which a composite is heated and compressed in a molding die to be deformed into a predetermined shape, and the composite is then cooled and solidified, and then taken out as a press-molded article.

Further, the molding processing temperature in injection molding or press molding in the step (V) is preferably lower than the temperature in preparation of the composite in the step (III-1), (III-2) or (III-3). It is preferable to employ the above-mentioned temperature condition because generation of volatile components resulting from thermal decomposition of the composite or the like can be suppressed in molding processing in the step (V) so that volatile components generated during molding processing can be decreased and, therefore, adhesion between the component (C-1), (C-2) or (C-3) and the reinforcing fibers (D) can be improved in the resulting molded article, and thus the dynamic characteristics of the carbon fiber-reinforced polyarylene sulfide can be improved while the molding cycle characteristics of the carbon fiber-reinforced polyarylene sulfide is secured.

The molding processing temperature in the step (V) refers to the temperature of a cylinder of an injection molding machine or the temperature of a molding die of a press molding machine. The molding processing temperature may be, for example, 280 to 330° C., and is more preferably 280 to 300° C. When the molding processing temperature in the step (V) is above the above-mentioned range, the dynamic characteristics and molding cycle characteristics of the resulting carbon fiber-reinforced polyarylene sulfide may be deteriorated due to thermal decomposition of the composite. When the molding processing temperature is below the above-mentioned range, it may be unable to process the composite.

The time required for molding processing of the composite in the step (V) is preferably 0.15 to 120 minutes, more preferably 0.15 to 30 minutes, further preferably 0.15 to 10 minutes. When the time is in the above-mentioned range, the carbon fiber-reinforced polyarylene sulfide is produced with high productivity.

The method of producing a carbon fiber-reinforced polyarylene sulfide is capable of reducing bleed-out of the polyarylene sulfide (B) while maintaining the molding processability of the resulting composite by passing through the steps (I-1) to (III-1), (I-2) to (III-2) or (I-3) to (III-3), and the step (IV) and/or the step (V) in addition thereto as necessary.

The polyarylene sulfide (A), the polycarbodiimide (B) and the carbon fibers (C) as components will now be described.

Polyarylene Sulfide (A)

The polyarylene sulfide (A) (hereinafter, sometimes abbreviated as PAS) is a homopolymer or a copolymer which has a repeating unit of the formula —(Ar—S)— as a main constituent unit and contains preferably 80 mol % or more, more preferably 90 mol % or more, further preferably 95 mol % or more of the repeating unit. Examples of Ar include units represented by formulae (a) to (k), and units represented by formula (a) are especially preferable.

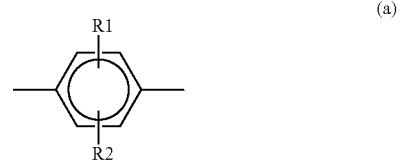

(a)

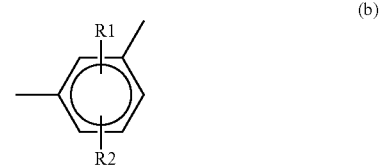

(b)

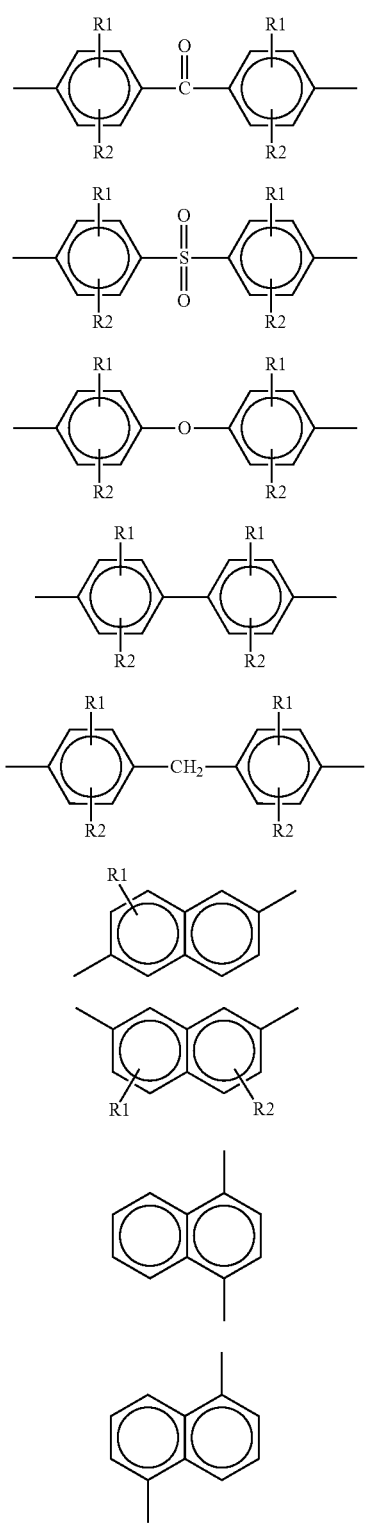

wherein R1 and R2 each represent a substituent selected from hydrogen, an alkyl group having 1 to 12 carbon atoms, an alkoxy group having 1 to 12 carbon atoms, an arylene group having 6 to 24 carbons, and a halogen group, and R1 and R2 may be the same, or different.

As long as the polyarylene sulfide has the above-mentioned repeating unit as a main constituent unit, it may contain a small amount of branched units or crosslinked units represented by the following formulae (I) to (n). The copolymerization amount of branched units or crosslinked units is preferably in the range of 0 to 1 mol % based on 1 mol of the —(Ar—S)— unit.

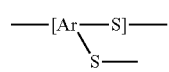 (l)

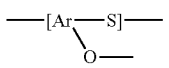 (m)

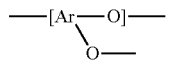 (n)

The PAS (A) may be any one of a random copolymer and a block copolymer including the above-mentioned repeating unit, and a mixture thereof.

Typical examples of the PAS (A) include polyphenylene sulfides (formulae (a), (b) and (f) to (k)), polyphenylene sulfide sulfones (formula (d)), polyphenylene sulfide ketones (formula (c)), polyphenylene sulfide ethers (formula (e)), random copolymers and block copolymers thereof, and mixtures thereof. Examples of the particularly preferred PAS (A) include polyphenylene sulfides (hereinafter, sometimes abbreviated as PPS) containing 80 mol % or more, particularly 90 mol % or more of a p-phenylene sulfide unit:

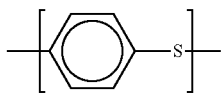

as a main constituent unit of the polymer.

The PAS (A) has a mass average molecular weight of preferably 10,000 to 80,000, more preferably 10,000 to 60,000, further preferably 10,000 to 40,000. It is preferable that the PAS (A) has a small mass average molecular weight, and hence a low melt viscosity because combination with the carbon fibers (D) is facilitated, leading to excellent productivity of the carbon fiber-reinforced polyarylene sulfide.

The mass average molecular weight of the PAS (A) can be measured using generally known GPC (gel permeation chromatography) such as size exclusion chromatography (SEC). The mass average molecular weight of the PAS can be determined by calculating the mass average molecular weight in terms of polystyrene with 1-chloronaphthalene used as an eluent and the column temperature set to 210° C.

Preferably, the PAS (A) has functional groups at the ends of the main chain and/or the side chain. The main chain mentioned here refers to a chain structural part that is the longest in the polymer structure, and a part branched from the main chain is referred to as a side chain. The polymer structure refers to a part in which single structural units are repeatedly coupled, or a part in which a plurality of structural units is regularly or randomly coupled, and the end refers to the last structural unit at which coupling is stopped. Preferably, functional groups of the PAS (A) exist at one or more of the ends of the main chain and/or the side chain in the polymer structure, and the ratio of PASs, which have such functional groups, to the PAS (A) is preferably 50% by mass or more, more preferably 60% by mass or more, further preferably 80% by mass or more. When the above-mentioned conditions are satisfied, a carbon fiber-reinforced polyarylene sulfide excellent in dynamic characteristics is obtained.

As the functional groups of the PAS (A), remaining functional groups of monomers used in polymerization, functional groups formed with a catalyst, auxiliary or solvent taken to the end during polymerization, functional groups with a polymer structure cut through thermal decomposition, hydrolysis or the like, and functional groups with the above-mentioned functional groups oxidized, reduced and modified with a modifier can be used. Examples of the modifier may include epichlorohydrin, polyfunctional epoxy resins and acid anhydrides. Among them, remaining functional groups of monomers used in polymerization, and functional groups formed with a catalyst, auxiliary or solvent taken to the end during polymerization are preferably used because damage to the polymer structure is small, and the molecular weight is easily controlled.

Specific examples of the functional group of the PAS (A) may include a thiol group, an epoxy group, a carboxyl group, metal salts of carboxyl groups, an amino group, a hydroxyl group, an isocyanate group, an oxazoline group and a sulfonate group. Among these functional groups, a thiol group, an epoxy group, a carboxyl group, metal salts of carboxyl groups, an amino group and a hydroxyl group are preferable from the viewpoint of reactivity with a carbodiimide group, and a thiol group, a carboxyl group, an amino group and a hydroxyl group are especially preferable.

In the PAS (A), the amount of oligomers extracted with chloroform is preferably 2% by mass or less, more preferably 1% by mass or less. The amount of oligomers extracted with chloroform serves as an index of the amount of organic low-polymerization components (oligomers), and can be calculated from the amount of residues at the time when 10 g of the PAS (A) to be measured is Soxhlet-extracted for 5 hours using 200 ml of chloroform. When the amount of oligomer components in the PAS (A) decreases, functional groups of polymer components in the PAS (A) and carbodiimide groups of the polycarbodiimide (B) can more selectively react with each other and, therefore, a carbon fiber-reinforced polyarylene sulfide excellent in molding cycle characteristics is obtained.

The PAS (A) can be produced with a high yield by recovering from a polymerization reaction product obtained by reacting a polyhalogen aromatic compound with a sulfidation agent in a polar organic solvent, and post-treating the recovered PAS (A).

The polyhalogenated aromatic compound is a compound having two or more halogen atoms in one molecule. Specific examples thereof include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene and 1-methoxy-2,5-dicyclobenzene. Among them, p-dichlorobenzene is preferably used. Two or more different polyhalogenated aromatic compounds can be combined to obtain a copolymer, but it is preferable that a p-dihalogenated aromatic compound is used as a main component.

The use amount of the polyhalogenated aromatic compound may be, for example, in the range of 0.9 to 2.0 mol, preferably 0.95 to 1.5 mol, further preferably 1.005 to 1.2 mol per mol of the sulfidation agent for obtaining the PAS (A) having a mass average molecular weight suitable for processing.

Examples of the sulfidation agent include alkali metal sulfides, alkali metal hydrosulfides and hydrogen sulfide.

Specific examples of the alkali metal sulfide may include lithium sulfide, sodium sulfide, potassium sulfide, rubidium sulfide, cesium sulfide, and mixtures of two or more thereof, and among them, sodium sulfide is preferably used. These alkali metal sulfides can be used as a hydrate or an aqueous mixture, or in the form of an anhydride.

Specific examples of the alkali metal hydrosulfide may include sodium hydrosulfide, potassium hydrosulfide, lithium hydrosulfide, rubidium hydrosulfide, cesium hydrosulfide, and mixtures of two or more thereof, and among them, sodium hydrosulfide is preferably used. These alkali metal hydrosulfides can be used as a hydrate or an aqueous mixture, or in the form of an anhydride.

When a dehydration process or the like causes a partial loss of the sulfidation agent before a polymerization reaction is started in production of the PAS (A), the amount of the sulfidation agent to be added means a residual amount determined by subtracting the loss from the actual added amount.

An alkali metal hydroxide and/or an alkali earth metal hydroxide can be used in combination with the sulfidation agent. Specific examples of the preferred alkali metal hydroxide may include sodium hydroxide, potassium hydroxide, lithium hydroxide, rubidium hydroxide, cesium hydroxide and mixtures of two or more thereof. Specific examples of the alkali earth metal hydroxide include calcium hydroxide, strontium hydroxide and barium hydroxide, and among them, sodium hydroxide is preferably used.

When an alkali metal hydrosulfide is used as the sulfidation agent, it is especially preferable to use an alkali metal hydroxide in combination, and the use amount of the alkali metal hydroxide may be, for example, 0.95 to 1.20 mol, preferably 1.00 to 1.15 mol, further preferably 1.005 to 1.100 mol based on 1 mol of the alkali metal hydrosulfide.

Hereinafter, for one example of a method of producing the PAS (A), a pre-step, a polymerization reaction step, a recovery step and a post-treatment step will be described in detail in due order.

First, the pre-step will be described. The sulfidation agent is used usually in the form of a hydrate, and it is preferable that before a polyhalogenated aromatic compound is added, a mixture containing an organic polar solvent and the sulfidation agent is heated to remove an excessive amount of water to outside the system. It is preferable that water is added to make up for shortage of water when water is excessively removed in this process.

An alkali metal sulfide prepared from an alkali metal hydrosulfide and an alkali metal hydroxide in situ in the reaction system, or in a tank different from a polymerization tank can also be used as the sulfidation agent. For desirable conditions to prepare an alkali metal sulfide, an alkali metal hydrosulfide and an alkali metal hydroxide are added to an organic polar solvent under an inert gas atmosphere at a temperature of from normal temperature to 150° C. or higher, more preferably from normal temperature to 100° C., and the mixture is heated to 150° C., more preferably 180 to 260° C., under normal pressure or reduced pressure to distill off water. A polymerization auxiliary may be added in this stage. To promote distillation of water, toluene or the like may be added to induce a reaction.

The amount of water in the polymerization system in polymerization reaction is preferably 0.5 to 10.0 mol per mol of the sulfidation agent to be added. The amount of water in the polymerization system is an amount determined by subtracting the amount of water removed to outside the polymerization system from the amount of water added in the polymerization system. The water to be added may be in the form of any of water, an aqueous solution, crystal water and so on. The amount of water is more preferably 0.75 to 2.5 mol, still more preferably 1.0 to 1.25 mol per mol of the sulfidation agent. To adjust the water content to fall within the above-mentioned range, water can be added before or during polymerization.

In the polymerization reaction step, the sulfidation agent and the polyhalogenated aromatic compound are reacted with each other in an organic polar solvent such as N-methyl-2-pyrrolidone at a temperature of not lower than 200° C. and not higher than 290° C. to produce the PAS (A).

In the start of the polymerization reaction step, the sulfidation agent and the polyhalogenated aromatic compound are added to the organic polar solvent at a temperature of normal to 220° C., preferably from 100 to 220° C. desirably under an inert gas atmosphere. A polymerization auxiliary such as sodium acetate may be added in this stage. The polymerization auxiliary means a substance having an action of adjusting the viscosity of the resulting PAS (A). These raw materials may be added in random order, or at the same time.

The mixture is usually heated to a temperature of 200° C. to 290° C. The heating rate is not particularly limited, but a rate of usually 0.01 to 5° C./minute, more preferably 0.1 to 3° C./minute is selected.

The mixture is heated ultimately to a temperature of 250 to 290° C., and mixed at this temperature for 0.25 to 50 hours, preferably for 0.5 to 20 hours.

A method in which before reaching the ultimate temperature, the mixture is reacted at, for example, 200° C. to 245° C. for a fixed time, and then heated to 250 to 290° C. is effective to achieve a higher polymerization degree. Thus, the reaction time at 200° C. to 245° C. is selected usually at 0.25 hours to 20 hours, preferably 0.25 to 10 hours.

After completion of polymerization, a solid material is recovered from the polymerization reaction product containing a polymer, a solvent and so on. Examples of the recovery method include a flash method, i.e., a method in which a polymerization reaction product is flashed from a high-temperature and high-pressure state (usually 245° C. or higher and 0.8 MPa or higher) into an atmosphere at usual pressure or reduced pressure to recover a polymer in a powdery form in parallel to recovery of a solvent, and a quenching method, i.e., a method in which a polymerization reaction product is gradually cooled from a high-temperature and high-pressure state to precipitate a PAS component in the reaction system, and separated by filtration at 70° C. or higher, preferably 100° C. or higher so that a solid containing the PAS component is recovered in a granular form.

The method of recovering the PAS (A) is not limited to one of the quenching method and the flash method, but the PAS (A) obtained by the quenching method is preferable because the content of oligomer components as represented by chloroform-extracted components is low, and a carbon fiber-reinforced polyarylene sulfide excellent in molding cycle characteristics is obtained. The amount of oligomers extracted with chloroform in the PAS obtained by the quenching method may be, for example, 2% by mass or less, more preferably 1% by mass or less.

After being produced by passing through the polymerization and recovery steps, the PAS (A) is subjected to a hot water treatment or washing with an organic solvent (post treatment step). The PAS (A) obtained by passing through the recovery step is commonly washed because it contains ionic impurities such as an alkali metal halide and an alkali metal organic substance which are polymerization by-products. As a washing liquid, for example, water or an organic solvent is used, and washing with water may be mentioned as an example of the preferred washing method from the viewpoint of easily obtaining the PAS (A) at a low cost. As a type of water to be used, ion-exchanged water or distilled water is preferably used.

The washing temperature at the time of washing the PAS (A) is preferably not lower than 50° C. and not higher than 200° C., more preferably not lower than 150° C. and not higher than 200° C., further preferably not lower than 180° C. and not higher than 200° C. The process for the treatment with a liquid at 100° C. or higher is performed usually by feeding a predetermined amount of the PAS (A) to a predetermined amount of a liquid, and heating and stirring the mixture at normal pressure or in a pressure vessel. Washing may be performed over a plurality of times and the washing temperature may be different in each washing process, but for obtaining the PAS (A) having a reduced amount of ionic impurities, it is practical to perform washing at least once, preferably two or more times at a temperature of 150° C. or higher, and it is preferable that a filtration step of separating a polymer and a washing liquid is provided between the washing processes.

When washing is performed in preparation of the PAS (A), a washing additive may be used, and the washing additive may be, for example, an acid, an alkali metal salt or an alkali earth metal salt. When an acid is used, it is preferable that an acidic aqueous solution is prepared by adding an organic acid, an inorganic acid or the like to water to be used for washing, a PAS to be washed is immersed in the aqueous solution, and heated and washed such that the aqueous solution after the washing has a pH of 2 to 8. Examples of the organic acid or inorganic acid may include, but are not limited to, acetic acid, propionic acid, hydrochloric acid, sulfuric acid, phosphoric acid and formic acid, with acetic acid and hydrochloric acid being preferable. The PAS (A) obtained using an acid as a washing additive is referred to as an acid end product. When an alkali metal salt or an alkali earth metal salt is used as the washing additive, for example, a method may be used in which a PAS to be washed is immersed in an aqueous solution prepared by adding an alkali metal salt or an alkali earth metal salt to water to be used for washing. The amount of the alkali metal salt or alkali earth metal salt is preferably 0.01 to 5% by mass, further preferably 0.1 to 0.7% by mass based on the amount of the PAS (A). Examples of the alkali metal salt or alkali earth metal salt may include, but are not limited to, calcium salts, potassium salts, sodium salts and magnesium salts of the above-mentioned organic acids or inorganic acids.

The washing additive may be used in any stage of the washing step, but to efficiently perform washing with a small amount of the additive, a method is preferably used in which a solid material recovered in the recovery step is washed with water over several times, and a PAS to be washed is then immersed in an aqueous solution containing a washing additive, and treated at 150° C. or higher. The ratio of the washing liquid to the PAS in washing is preferably large, but usually such a ratio that preferably 10 to 500 g, further preferably 50 to 200 g of the PAS (A) is immersed in 1 liter of the washing liquid is selected.

The PAS (A) thus obtained is dried under normal pressure and/or reduced pressure. The drying temperature is preferably 120 to 280° C., more preferably 140 to 250° C. The drying atmosphere may be an inert atmosphere such as that of nitrogen or helium or an atmosphere under reduced pressure, an oxidizing atmosphere such as that of oxygen or air, or an atmosphere of mixed air and nitrogen, but an inert atmosphere is preferable in view of the melt viscosity. The drying time is preferably 0.5 to 50 hours, more preferably 1 to 30 hours, further preferably 1 to 20 hours.

Polycarbodiimide (B)

Examples of the polycarbodiimide (B) may include aliphatic polycarbodiimides and aromatic polycarbodiimides. The polycarbodiimide (B) is not limited to one of an aliphatic polycarbodiimide and an aromatic polycarbodiimide, but it is preferably an aliphatic polycarbodiimide because the reactivity of the carbodiimide group is high, and a fiber-reinforced polyarylene sulfide excellent in molding cycle characteristics is obtained.

The aliphatic polycarbodiimide is a homopolymer or a copolymer having as a main constituent unit a repeating unit represented by the general formula —N=C=N—$R_3$— (wherein $R_3$ represents a divalent organic group of a cycloaliphatic compound such as cyclohexylene, or a divalent organic group of an aliphatic compound such as methylene, ethylene, propylene or methylethylene) and contains preferably 70 mol % or more, more preferably 90 mol % or more, further preferably 95 mol % or more of the repeating unit.

The method of synthesizing an aliphatic polycarbodiimide is not particularly limited, and the aliphatic polycarbodiimide can be synthesized by, for example, reacting an organic polyisocyanate in the presence of a catalyst that accelerates the carbodiimidation reaction of isocyanate groups (hereinafter, also referred to as a "carbodiimidation catalyst").

The organic polyisocyanate to be used for synthesis of the aliphatic polycarbodiimide is preferably an organic diisocyanate. Examples of the organic diisocyanate may include cyclobutylene-1,3-diisocyanate, cyclopentylene-1,3-diisocyanate, cyclohexylene-1,3-diisocyanate, cyclohexylene-1,4-diisocyanate, 1-methylcyclohexylene-2,4-diisocyanate, 1-methylcyclohexylene-2,6-diisocyanate, 1-isocyanate-3,3,5-trimethyl-5-isocyanate methylcyclohexane, cyclohexane-1,3-bis(methylisocyanate), cyclohexane-1,4-bis(methylisocyanate), dicyclohexylmethane-2,4'-diisocyanate, dicyclohexylmethane-4,4'-diisocyanate, ethylene diisocyanate, tetramethylene-1,4-diisocyanate, hexamethylene-1,6-diisocyanate, dodecamethylene-1,12-diisocyanate, lysine diisocyanate methyl ester and the like, and prepolymers with isocyanate at both ends, obtained by reacting a stoichiometrically excessive amount of any of these organic diisocyanates with a difunctional active hydrogen-containing compound. These organic diisocyanates may be used alone, or used in combination of two or more thereof.

Examples of other organic polyisocyanates that are optionally used together with the organic diisocyanate may include tri-or-more functional organic polyisocyanates such as cyclohexane-1,3,5-triisocyanate, cyclohexane-1,3,5-tris(methylisocyanate), 3,5-dimethylcyclohexane-1,3,5-tris(methylisocyanate), 1,3,5-trimethylcyclohexane-1,3,5-tris(methylisocyanate), dicyclohexylmethane-2,4,2'-triisocyanate and dicyclohexylmethane-2,4,4'-triisocyanate, and prepolymers with isocyanate on the end, obtained by reacting a stoichiometrically excessive amount of any of these tri-or-more functional group organic polyisocyanates with a di-or-more functional active hydrogen-containing compound.

The other organic polyisocyanates may be used alone, or used in combination of two or more thereof. The amount thereof is preferably 0 to 40 parts by mass, more preferably 0 to 20 parts by mass based on 100 parts by mass of the organic diisocyanate.

Further, in synthesis of an aliphatic polycarbodiimide, the molecular weight of the resulting aliphatic polycarbodiimide can be appropriately controlled by adding an organic monoisocyanate as necessary.

Examples of the organic monoisocyanate may include alkyl monoisocyanates such as methyl isocyanate, ethyl isocyanate, n-propyl isocyanate, n-butyl isocyanate, lauryl isocyanate and stearyl isocyanate, and cycloalkyl monoisocyanates such as cyclohexyl isocyanate, 4-methylcyclohexyl isocyanate and 2,5-dimethylcyclohexyl isocyanate.

These organic monoisocyanates may be used alone, or used in combination of two or more thereof, and the amount thereof varies depending on a desired molecular weight of the aliphatic polycarbodiimide or the like, but it is preferably 0 to 40 parts by mass, more preferably 0 to 20 parts by mass based on 100 parts by mass of the organic polyisocyanate component.

Examples of the carbodiimidation catalyst may include 1-phenyl-2-phospholene-1-oxide, 1-phenyl-3-methyl-2-phospholene-1-oxide, 1-phenyl-2-phospholene-1-sulfide, 1-phenyl-3-methyl-2-phospholene-1-sulfide, 1-ethyl-2-phospholene-1-oxide, 1-ethyl-3-methyl-2-phospholene-1-oxide, 1-ethyl-2-phospholene-1-sulfide, 1-ethyl-3-methyl-2-phospholene-1-sulfide, 1-methyl-2-phospholene-1-oxide, 1-methyl-3-methyl-2-phospholene-1-oxide, 1-methyl-2-phospholene-1-sulfide, 1-methyl-3-methyl-2-phospholene-1-sulfide, phospholene compounds such as 3-phospholene isomers thereof, metal carbonyl complexes such as pentacarbonyliron, nonacarbonyldiiron, tetracarbonylnickel, hexacarbonyltungsten and hexacarbonylchromium, acetylacetone complexes of metals such as beryllium, aluminum, zirconium, chromium and iron, and phosphoric acid esters such as trimethyl phosphate, triethyl phosphate, triisopropyl phosphate, tri-t-butyl phosphate and triphenyl phosphate.

The carbodiimidation catalysts may be used alone, or in combination of two or more thereof. The amount of the catalyst is preferably 0.001 to 30 parts by mass, more preferably 0.01 to 10 parts by mass based on 100 parts by mass of the organic polyisocyanate.

The temperature in the aliphatic polycarbodiimide synthesis reaction is appropriately selected according to the types of the organic polyisocyanate, organic monoisocyanate and carbodiimidation catalyst, but it is usually 20 to 200° C. In the aliphatic polycarbodiimide synthesis reaction, the organic polyisocyanate and organic monoisocyanate components may be all added before the reaction, or partially or totally added continuously or stepwise during the reaction.

A compound capable of reacting with isocyanate groups is added in an appropriate reaction stage between the initial stage and the late stage of the aliphatic polycarbodiimide synthesis reaction to block the terminal isocyanate groups of the aliphatic polycarbodiimide, whereby the molecular weight of the resulting aliphatic polycarbodiimide can be controlled, or the compound capable of reacting with isocyanate groups is added in the late stage of the aliphatic polycarbodiimide synthesis reaction, whereby the molecular weight of the resulting aliphatic polycarbodiimide can be regulated to a predetermined value. Examples of the compound capable of reacting with isocyanate groups may include alcohols such as methanol, ethanol, isopropanol and cyclohexanol, and amines such as dimethylamine, diethylamine and benzylamine.

The aromatic polycarbodiimide is a homopolymer or a copolymer having as a main constituent unit a repeating unit represented by the general formula —N=C=N—R$_4$— (wherein R$_4$ represents a divalent organic group of a cyclic unsaturated compound such as benzene, toluene, xylene, biphenyl, naphthalene or anthracene) and contains preferably 70 mol % or more, more preferably 90 mol % or more, further preferably 95 mol % or more of the repeating unit.

Examples of the aromatic polycarbodiimide include "STABAXOL (registered trademark)" P manufactured by Rhein Chemie Ltd. and "STABAXOL (registered trademark)" P400 manufactured by Rhein Chemie Ltd.

The polycarbodiimide (B) has a mass average molecular weight of preferably 500 to 40,000, more preferably 1,000 to 5,000. When the mass average molecular weight of the polycarbodiimide (B) is less than 500, the molding cycle characteristics of the resulting carbon fiber-reinforced polyarylene sulfide may be deteriorated. When the mass average molecular weight of the polycarbodiimide (B) is more than 40,000, the melt kneadability of the PAS (A) may be deteriorated, leading to deterioration of the molding cycle characteristics of the resulting carbon fiber-reinforced polyarylene sulfide. The mass average molecular weight of the polycarbodiimide (B) can be determined by an analysis method such as SEC (size exclusion chromatography).

Carbon Fibers (D)

As the carbon fibers (D), polyacrylonitrile (PAN)-based carbon fibers, pitch-based carbon fibers, rayon-based carbon fibers and the like can be used, and two or more types of these fibers may be used in combination.

The carbon fibers (D) have a tensile strength of preferably 2,000 MPa or more, more preferably 3,000 MPa or more, further preferably 4,000 MPa or more. The carbon fibers (D) have a tensile elastic modulus of preferably not less than 200 GPa and not more than 700 GPa. Further, the carbon fibers (D) have a tensile elongation of preferably 0.5% or more, more preferably 1.0% or more, further preferably 1.8% or more, especially preferably 2.0% or more. It is especially preferable that carbon fibers (D) having a high elongation is used because improvement of the dynamic characteristics such as the tensile strength and elongation, of the carbon fiber-reinforced polyarylene sulfide can be achieved at a high level. PAN-based carbon fibers are preferably used as the carbon fibers (D) from the viewpoint of balance among the tensile strength, the tensile elastic modulus and the tensile elongation.

The carbon fibers (D) have a surface oxygen concentration ratio (O/C) of preferably 0.05 to 0.50, more preferably 0.08 to 0.40, further preferably 0.10 to 0.30, the surface oxygen concentration ratio being a ratio of the number of atoms of oxygen (O) to carbon (C) on the fiber surface as measured by X-ray photoelectron spectroscopy (XPS). Higher the surface oxygen concentration ratio (O/C), larger the number of functional groups on the carbon fiber surface so that bondability to other components can be improved, but when the surface oxygen concentration ratio (O/C) is excessively high, the crystal structure of the carbon fiber surface may be ruptured, and therefore a carbon fiber-reinforced polyarylene sulfide that is particularly excellent in dynamic characteristics can be obtained when the surface oxygen concentration ratio (O/C) is in the preferred range.

The surface oxygen concentration ratio (O/C) of the carbon fibers (D) is determined in accordance with the following procedure by X-ray photoelectron spectroscopy. First, the carbon fibers (D) freed of the sizing agent or the like by a solvent are cut, and spread and arranged on a sample supporting stand made of copper, the photoelectron escape angle is then set to 90°, and the inside of a sample chamber is kept at $1 \times 10^{-8}$ Torr with MgK$_{\alpha 1,2}$ used as an X-ray source. The kinetic energy value (K.E.) at the main peak of C1S is matched to 969 eV as a correction of a peak associated with charging during measurement. The C1S peak area is determined by drawing a straight baseline over 958 to 972 eV as K.E. The O1S peak area is determined by drawing a straight baseline over 714 to 726 eV as K.E. The surface oxygen concentration ratio (O/C) is calculated as the ratio of the number of atoms from the ratio of the O1S peak area and the C1S peak area using an apparatus-specific sensitivity correction value.

The method of controlling the surface oxygen concentration ratio (O/C) is not particularly limited and, for example, methods such as an electrolytic oxidation treatment, a chemical oxidation treatment and a gas phase oxidation treatment can be employed, with the electrolytic oxidation treatment being preferable.

The average fiber diameter of the carbon fibers (D) is preferably 1 to 20 µm, more preferably 3 to 15 µm. It is preferable that the average fiber diameter of the carbon fibers (D) is in the above-mentioned range because combination of the component (C-1), (C-2) or (C-3) with the carbon fibers (D) is facilitated in the step (III-1), (III-2) or (III-3).

Preferably, the carbon fibers (D) are surface-treated with a compound having, in one molecule, three or more functional groups of at least one type selected from the group consisting of a carboxyl group, a hydroxyl group and an epoxy group (hereinafter, abbreviated as compound (E)). Two or more of types of the functional groups may exist in one molecule, or two or more compounds having three or more functional groups of one type in one molecule may be used in combination. When only a compound in which the number of the functional groups in one molecule is less than 3 is used, reaction points between the compound and the surface functional groups of the carbon fibers (D) or the component (C-1), (C-2) or (C-3) may be insufficient, leading to deterioration of the dynamic characteristics of the resulting carbon fiber-reinforced polyarylene sulfide. A functional group other than the above-mentioned functional groups, for example, an alkoxysilane, is poor in reactivity with the carbon fiber surface and, therefore, when a silane coupling agent having one alkoxysilane and one epoxy group in one molecule is used, a carbon fiber-reinforced polyarylene sulfide excellent in dynamic characteristics may not be obtained.

Specific examples of the compound (E) include polyfunctional epoxy resins, acrylic acid-based polymers and polyhydric alcohols and, above all, polyfunctional epoxy resins having high reactivity with the surface functional groups of the carbon fibers (D) and the component (C-1), (C-2) or (C-3) are preferable.

Examples of the polyfunctional epoxy resin include tri-or-more functional aliphatic epoxy resins and phenol novolac-type epoxy resins. The tri-or-more functional aliphatic epoxy resin means an aliphatic epoxy resin having three or more epoxy groups in one molecule.

Specific examples of the tri-or-more functional aliphatic epoxy resin include polyglycidyl ethers of aliphatic polyhydric alcohols such as glycerol triglycidyl ether, diglycerol polyglycidyl ether, polyglycerol polyglycidyl ether, sorbitol polyglycidyl ether, arabitol polyglycidyl ether, trimethylolpropane triglycidyl ether and pentaerythritol polyglycidyl ether. Among these aliphatic epoxy resins, glycerol triglycidyl ether, diglycerol polyglycidyl ether and polyglycerol polyglycidyl ether are preferably used because they contain a large number of epoxy groups having high reactivity in one molecule, have high water solubility, and are easily applied to the carbon fibers (D).

The acrylic acid-based polymer is a generic name of polymers which are polymers of acrylic acid, methacrylic acid and maleic acid, and contain three or more carboxyl groups in one molecule. Specific examples of the acrylic acid-based polymer include polyacrylic acids, copolymers of acrylic acid and methacrylic acid, copolymers of acrylic acid and maleic acid, and mixtures of two or more thereof. Further, the acrylic acid-based polymer may be one with the carboxyl group partially neutralized with an alkali (i.e., formed into a carboxylate) as long as the number of functional groups as described above is 3 or more in one molecule. Examples of the alkali include alkali metal hydroxides such as sodium hydroxide, lithium hydroxide and potassium hydroxide, and ammonium hydroxide. As the acrylic acid-based polymer, a polyacrylic acid containing a larger number of carboxyl groups in one molecule is preferably used.

Specific examples of polyhydric alcohol include polyvinyl alcohol, glycerol, diglycerol, polyglycerol, sorbitol, arabitol, trimethylolpropane and pentaerythritol. As the polyhydric alcohol, a polyvinyl alcohol containing a larger number of hydroxyl groups in one molecule is preferably used.

In the compound (E), the value obtained by dividing the mass average molecular weight of the compound by the number of the above-described functional groups (the total number of carboxyl groups, hydroxyl groups and epoxy groups) in one molecule is preferably 40 to 150. When the above-mentioned value is in such a range, the density of reaction points of the compound E with the surface functional groups of the carbon fibers (D) and the carbodiimide group of the component (C-1), (C-2) or (C-3) can be made more uniform so that the dynamic characteristics of the resulting carbon fiber-reinforced polyarylene sulfide can be further improved.

Preferably, the compound (E) exists at the interface between the component (C-1), (C-2) or (C-3) and the carbon fibers (D). Accordingly, the compound (E) is applied to the surfaces of carbon fiber (D) monofilaments. By adding the compound (E) to the carbon fibers (D) beforehand, the surfaces of the carbon fibers (D) can be effectively modified even with a small deposition amount.

The content of the compound (E) is preferably 0.01 to 5 parts by mass, more preferably 0.1 to 2 parts by mass based on 100 parts by mass of the carbon fibers (D). When the content of the compound (E) is less than 0.01 part by mass, it may be unable to sufficiently cover the surfaces of the carbon fibers (D) with the compound (E) so that the effect of improving the dynamic characteristics of the resulting carbon fiber-reinforced polyarylene sulfide is hard to be exhibited. When the content of the compound (E) is more than 5 parts by mass, the thickness of a film formed on the surfaces of the carbon fibers (D) by the compound (E) may excessively increase, resulting in deterioration of the dynamic characteristics of the resulting carbon fiber-reinforced polyarylene sulfide. The preferred range of the thickness of a film formed on the surfaces of the carbon fibers (D) by the compound (E) may be, for example, 10 to 150 nm.

Examples of the method of adding the compound (E) to the carbon fibers (D) include a method in which a base material including the carbon fibers (D) is immersed in the compound (E) via a roller, and a method in which the compound (E) is atomized, and sprayed to the base material including the carbon fibers (D). It is preferable that the compound (E) is diluted with a solvent or the temperature, the yearn tension or the like in addition of the compound (E) is controlled so that the deposition amount of the compound (E) on the carbon fiber (D) monofilaments becomes more uniform. Examples of the solvent to dilute the compound (E) include water, methanol, ethanol, dimethylformamide, dimethylacetamide and acetone, and water is preferable from the viewpoint of ease of handling and disaster prevention. The solvent is evaporated by heating and removed after the compound (E) is added to the base material including the carbon fibers (D). When a compound insoluble or hardly soluble in water is used as the compound (E), it is preferable that the compound is dispersed in water with an emulsifier or surfactant added thereto. As the emulsifier or surfactant, anionic emulsifiers, cationic emulsifiers, nonionic emulsifiers and the like can be used. Among them, nonionic emulsifiers which have low interactivity are preferably used because they hardly hinder the effect of the compound (E).

Other Additives

The carbon fiber-reinforced polyarylene sulfide may contain an impact resistance improving agent such as an elastomer or a rubber component, and other fillers and additives as long as the desired effect is not impaired. Examples of the additives include flame retardants, conductivity imparting agents, nucleating agents, ultraviolet absorbers, antioxidants, vibration controlling agents, antibacterial agents, insect repellents, deodorants, coloration preventing agents, heat stabilizers, mold release agents, antistatic agents, plasticizers, lubricants, colorants, pigments, dyes, foaming agents and antifoaming agents.

Product Produced Using Carbon Fiber-Reinforced Polyarylene Sulfide

The carbon fiber-reinforced polyarylene sulfide is suitable as electronic device housings, and is suitably used in computers, televisions, cameras, audio players and the like.

The carbon fiber-reinforced polyarylene sulfide is suitable in electric and electronic component applications, and is suitably used in connector, LED lamps, sockets, optical pickups, terminal plates, printed boards, speakers, small motors, magnetic heads, power modules, power generators, electric motors, transformers, current transformers, voltage regulators, rectifiers, inverters and the like.

The carbon fiber-reinforced polyarylene sulfide is suitable for automobile components, vehicle related components and so on, and is suitably used in safety belt components, instrument panels, console boxes, pillars, roof rails, fenders, bumpers, door panels, roof panels, hood panels, trunk lids, door mirror stays, spoilers, hood louvers, wheel covers, wheel caps, garnishes, intake manifolds, fuel pumps, engine cooling water joints, wind washer nozzles, wipers, battery peripheral components, wire harness connectors, lamp housings, lamp reflectors, lamp sockets and the like.

The carbon fiber-reinforced polyarylene sulfide is suitable as building materials, and is suitably used in wall, roof and ceiling material related components, window material related components, heat insulator material related components, floor material related components, base isolation vibration damping member related components, lifeline related components and the like in civil engineering and construction products.

The carbon fiber-reinforced polyarylene sulfide is suitable as sports goods, and is suitably used in golf related goods such as golf club shafts and golf balls, sports racket related goods such as tennis rackets and badminton rackets, body protection goods for sports such as masks, helmets, chest protectors, elbow pads and kneepads in American football, baseball, softball and the like, fishing tackle related goods such as fishing rods, reels and fishing lures, winter sports related goods such as skis and snowboards, and the like.

EXAMPLES

Our methods will be described further in detail below by way of examples.

First, evaluation methods will be described below.

(1) Bleed Test

The obtained carbon fiber-reinforced polyarylene sulfide was processed into a test piece (200 mm×200 mm; thickness: 1 mm). The test piece was sandwiched between two stainless steel plates (300 mm×300 mm; thickness: 10 mm; mirror-finished) preheated to 300° C., this was fed to a press molding machine, and press molding was performed. The press molding temperature was 300° C., the press molding pressure was 0.5 MPa, and the press molding time was 3 minutes. Next, the test piece sandwiched between the two stainless steel plates was taken out from the press molding machine, and cooled to room temperature, and the test pieces was then separated from the stainless steel plates. With one shot including the above process, the test piece was subjected to a plurality of shots of molding while only the stainless steel plates were reused, and the bleeding characteristic in a molding processing cycle was evaluated. The bleeding characteristic was evaluated at the 10th shot and the 30th shot in the following three grades on the basis of presence/absence of cloudiness on the surface of the stainless steel plate as an evaluation criterion, and samples rated excellent or good were considered as passing.

excellent: Cloudiness was not present on the surface of the stainless steel plate at the 30th shot.

good: Cloudiness was not present on the surface of the stainless steel plate at the 10th shot, and cloudiness was present on the surface of the stainless steel plate at the 30th shot.

bad: Cloudiness was present on the surface of the stainless steel plate at the 10th shot.

(2) Tension Test of Carbon Fiber-Reinforced Polyarylene Sulfide

In conformity with ASTM D638, a Type-I test piece was used, and "Instron (registered trademark)" Universal Tester Model 4201 (manufactured by Instron, Ltd.) was used as a tester. The tensile elongation refers to a breakage point strain measured using a strain gauge.

(3) Heat-Resistant Temperature of Polycarbodiimide Reaction Product (B-2)

A thermogravimetric analyzer (TGA7 manufactured by Perkin-Elmer Corporation) was used as a tester. A particulate material having a size of 2 mm or less was used as a sample. 10 mg of the sample was heated at a temperature elevation rate of 20° C./minute from 30° C. to 400° C. under an air atmosphere, and a change in mass of the sample was measured. The temperature at which the mass of the sample decreased by 5% by mass with respect to the mass at 30° C. in this process was defined as a heat-resistant temperature.

(4) Evaluation of Die Contamination

The surface of a molding die in injection molding in the step (V) was observed to evaluate die contamination in a molding processing cycle. With one shot including a process in which a composite prepared in the step (III-1), (III-2) or (III-3), or a composite prepared by passing through the step (IV) is melted in a cylinder of an injection molding machine, and the molten composite is injected into a molding die, cooled and solidified, and then taken out as an injection-molded article having a predetermined shape, the composite was subjected to a plurality of shots while the molding die was reused, and die contamination in a molding processing cycle was evaluated. Die contamination was evaluated at the 10th shot and the 30th shot in the following three grades on the basis of presence/absence of cloudiness on the surface of the molding die as an evaluation criterion, and samples rated excellent or good were considered as passing.

excellent: Cloudiness was not present on the surface of the molding die at the 30th shot.

good: Cloudiness was not present on the surface of the molding die at the 10th shot, and cloudiness was present on the surface of the molding die at the 30th shot.

bad: Cloudiness was present on the surface of the molding die at the 10th shot.

A PAS (A) used in the Examples and Comparative Examples is as follows:

(PPS-1) Polyphenylene sulfide (melting point: 285° C.; glass transition temperature: 90° C.; mass average molecular weight: 30,000; acid end product; chloroform extraction amount: 0.5% by mass).

A polycarbodiimide (B) used in the Reference Examples, Examples and Comparative Examples is as follows:

(CDI-1) Aliphatic polycarbodiimide ""CARBODILITE (registered trademark)" HMV-8CA (manufactured by Nisshinbo Chemical Inc.)" (carbodiimide equivalent: 278; mass average molecular weight: 3,000; softening point 70° C.).

A monocarbodiimide (B') used in the Comparative Examples is as follows:

(CDI-2) N,N'-dicyclohexylcarbodiimide (manufactured by Wako Pure Chemical Industries, Ltd.) (carbodiimide equivalent: 206; mass average molecular weight: 206).

Carbon fibers (C) used in the Reference Examples, Examples and Comparative Examples are as follows:

(CF-1) A copolymer mainly including polyacrylonitrile was subjected to spinning, a firing treatment and a surface oxidation treatment to obtain a continuous carbon fiber strand with a total monofilament number of 12,000. The characteristics of the carbon fiber were as shown below:

Tensile strength: 4,900 MPa
Tensile elastic modulus: 240 GPa
Tensile elongation: 2%
Specific gravity: 1.8
Diameter of monofilament: 7 μm
Surface oxygen concentration ratio [O/C]: 0.12.

Compounds (E) used in the Reference Examples, Examples and Comparative Examples are as follows:

(E-1) Glycerol triglycidyl ether (manufactured by Wako Pure Chemical Industries, Ltd.)

Mass average molecular weight: 260
Number of epoxy groups per molecule: 3
Value obtained by dividing the mass average molecular weight by the total number of carboxyl groups, hydroxyl groups, epoxy groups and hydroxyl groups per molecule: 87

(E-2) Polyacrylic acid (manufactured by SIGMA-ALDRICH Corporation)

Mass average molecular weight: 2,000
Number of carboxyl groups per molecule: 27
Value obtained by dividing the mass average molecular weight by the total number of carboxyl groups, hydroxyl groups, epoxy groups and hydroxyl groups per molecule: 74

(E-3) Polyvinyl alcohol (manufactured by Wako Pure Chemical Industries, Ltd.)

Mass average molecular weight: 22,000
Number of hydroxyl groups per molecule: 500
Value obtained by dividing the mass average molecular weight by the total number of carboxyl groups, hydroxyl groups, epoxy groups and hydroxyl groups per molecule: 44.

Reference Example 1

CF-1 was cut to a length of 6 mm by a cartridge cutter to prepare chopped carbon fibers. A dispersion liquid including water and a surfactant (Polyoxyethylene Lauryl Ether (trade name) manufactured by nacalai tesque) and having a concentration of 0.1% by mass was prepared, chopped carbon fibers were added to the dispersion liquid, and the mixture was stirred to prepare a carbon fiber dispersion liquid having a carbon fiber concentration of 0.05% by mass. The carbon fiber dispersion liquid was transferred to a cylindrical container having on the bottom part a mesh structure with a diameter of 500 mm, and subjected to suction filtration, and the residues were then heated and dried in a drying furnace at 200° C. for 30 minutes to prepare a carbon fiber base material (CFM-1) in the form of a nonwoven fabric. The basis weight of the obtained CFM-1 was 50 g/m$^2$.

Reference Example 2

E-1 was used as the component (E), CFM-1 prepared in Reference Example 1 was immersed in an aqueous dispersion mother liquor containing 2% by mass of the component (E), and then dried at 230° C. to prepare a base material (CFM-2) including carbon fibers (D) surface-treated with the component (E). The deposition amount of the component (E) after drying was 1 part by mass based on 100 parts by mass of the carbon fibers (D).

Reference Example 3

E-2 was used as the component (E), CFM-1 prepared in Reference Example 1 was immersed in an aqueous dispersion mother liquor containing 2% by mass of the component (E), and then dried at 230° C. to prepare a base material (CFM-3) including carbon fibers (D) surface-treated with the component (E). The deposition amount of the component (E) after drying was 1 part by mass based on 100 parts by mass of the carbon fibers (D).

Reference Example 4

E-3 was used as the component (E), CFM-1 prepared in Reference Example 1 was immersed in an aqueous dispersion mother liquor containing 2% by mass of the component (E), and then dried at 230° C. to prepare a base material (CFM-4) including carbon fibers (D) surface-treated with the component (E). The deposition amount of the component (E) after drying was 1 part by mass based on 100 parts by mass of the carbon fibers (D).

Example 1

Using the components and conditions shown in Table 1, a carbon fiber-reinforced polyarylene sulfide was produced by the first production method according to one example in accordance with the following procedure, and evaluated.
  Step (I-1): A mixture obtained by dry-blending the PAS (A) and the polycarbodiimide (B) was fed to a laboplastomill apparatus (Model 4C150 manufactured by Toyo Seiki Seisaku-Sho, Ltd., R-60 type mixer), and melt-kneaded to prepare a melt-kneaded product.
  Step (II-1): The obtained melt-kneaded product was transferred to a press molding machine in a molten state to prepare a film including a polycarbodiimide-modified polyarylene sulfide (C-1).
  Step (III-1): The obtained film was laminated alternately with the carbon fiber base material (CFM-2) in the form of a nonwoven fabric, and the resulting laminate was fed to a press molding machine to produce a carbon fiber-reinforced polyarylene sulfide.

Test pieces were cut out from the obtained carbon fiber-reinforced polyarylene sulfide, and subjected to tests. Evaluation results are described in Table 1.

Comparative Example 1

An attempt was made to prepare test pieces by carrying out the same procedure as in Example 1 except that in the step (I-1), the melt-kneading time was changed to 3,600 seconds, and in the step (II-1), the press temperature was changed to 50° C., and the press time was changed to 300 seconds, but combination of the polycarbodiimide-modified polyarylene sulfide (C-1) with the carbon fibers (D) in the step (III-1) was difficult, and thus a carbon fiber-reinforced polyarylene sulfide was not obtained. Evaluation results are described in Table 1.

Example 2

Except that the press time in the step (II-1) was changed to 1,800 seconds, the same procedure as in Example 1 was carried out to prepare test pieces, and the test pieces were subjected to evaluations. Evaluation results are described in Table 1.

Example 3

Except that the press time in the step (II-1) was changed to 900 seconds, the same procedure as in Example 1 was carried out to prepare test pieces, and the test pieces were subjected to evaluations. Evaluation results are described in Table 1.

Example 4

Except that the press temperature in the step (II-1) was changed to 200° C., the same procedure as in Example 1 was carried out to prepare test pieces, and the test pieces were subjected to evaluations. Evaluation results are described in Table 1.

Example 5

Except that the press temperature in the step (II-1) was changed to 150° C., the same procedure as in Example 1 was carried out to prepare test pieces, and the test pieces were subjected to evaluations. Evaluation results are described in Table 1.

Comparative Example 2

Except that the press temperature in the step (II-1) was changed to 50° C., the same procedure as in Example 1 was carried out to prepare test pieces, and the test pieces were subjected to evaluations. Evaluation results are described in Table 1.

Example 6

Except that the melt-kneading time in the step (I-1) was changed to 45 seconds, the same procedure as in Example 1 was carried out to prepare test pieces, and the test pieces were subjected to evaluations. Evaluation results are described in Table 1.

Example 7

Except that the amount of the polycarbodiimide (B) was changed to 1 part by mass based on 100 parts by mass of the PAS (A), the same procedure as in Example 1 was carried out to prepare test pieces, and the test pieces were subjected to evaluations. Evaluation results are described in Table 1.

Comparative Example 3

Except that the polycarbodiimide (B) was not included, the same procedure as in Example 1 was carried out to prepare test pieces, and the test pieces were subjected to evaluations. Evaluation results are described in Table 1.

Comparative Example 4

Except that the amount of the polycarbodiimide (B) was changed to 20 parts by mass based on 100 parts by mass of the PAS (A), the same procedure as in Example 1 was carried out to prepare test pieces, and the test pieces were subjected to evaluations. Evaluation results are described in Table 1.

Comparative Example 5

Except that the CDI-2 as the monocarbodiimide (B') was used in place of the polycarbodiimide (B), the same procedure as in Example 1 was carried out to prepare test pieces, and the test pieces were subjected to evaluations. Evaluation results are described in Table 1.

Example 8

Except that the content of the carbon fiber base material (CFM-2) in the form of a nonwoven fabric was changed so that the content of the carbon fibers (D) was 25 parts by mass based on 100 parts by mass of the PAS (A) while the deposition amount of the component (E) was 1 part by mass based on 100 parts by mass of the carbon fibers (D), the same procedure as in Example 1 was carried out to prepare test pieces, and the test pieces were subjected to evaluations. Evaluation results are described in Table 1.

Example 9

Except that the content of the carbon fiber base material (CFM-2) in the form of a nonwoven fabric was changed so that the content of the carbon fibers (D) was 100 parts by mass based on 100 parts by mass of the PAS (A) while the deposition amount of the component (E) was 1 part by mass based on 100 parts by mass of the carbon fibers (D), the same procedure as in Example 1 was carried out to prepare test pieces, and the test pieces were subjected to evaluations. Evaluation results are described in Table 1.

Example 10

Except that the component (E) was changed to E-2, and accordingly the carbon fiber base material (CFM-3) in the form of a nonwoven fabric was used, the same procedure as in Example 1 was carried out to prepare test pieces, and the test pieces were subjected to evaluations. Evaluation results are described in Table 1.

Example 11

Except that the component (E) was changed to E-3, and accordingly the carbon fiber base material (CFM-4) in the form of a nonwoven fabric was used, the same procedure as in Example 1 was carried out to prepare test pieces, and the test pieces were subjected to evaluations. Evaluation results are described in Table 1.

Example 12

Except that the component (E) was not included, and accordingly the carbon fiber base material (CFM-1) in the form of a nonwoven fabric was used, the same procedure as in Example 1 was carried out to prepare test pieces, and the test pieces were subjected to evaluations. Evaluation results are described in Table 1.

Example 13

Except that in the step (I-1), the mixer section of the labo-plastomill apparatus was covered with a vacuum chamber provided with a vacuum gauge and a vacuum pump, and the pressure reduction degree of the inside of the vacuum chamber during melt-kneading was adjusted to −0.1 MPa, the same procedure as in Example 3 was carried out to prepare test pieces, and the test pieces were subjected to evaluations. Evaluation results are described in Table 1.

Example 14

Except that as the step (IV), the carbon fiber-reinforced polyarylene sulfide prepared in the step (III-1) was fed to the press molding machine again, and heated under the conditions of a press temperature of 250° C., a press pressure of 0.5 MPa and a press time of 3600 seconds, the same procedure as in Example 3 was carried out to prepare test pieces, and the test pieces were subjected to evaluations. Evaluation results are described in Table 1.

TABLE 1

| | | Example 1 | Comparative Example 1 | Example 2 | Example 3 | Example 4 | Example 5 | Comparative Example 2 | Example 6 | Example 7 |
|---|---|---|---|---|---|---|---|---|---|---|
| (Components) | | | | | | | | | | |
| Polyarylene sulfide (A) | Type parts by mass | PPS - 1 100 | PPS - 1 100 | PPS - 1 100 | PPS - 1 100 | PPS - 1 100 | PPS - 1 100 | PPS - 1 100 | PPS - 1 100 | PPS - 1 100 |
| Polycarbodiimide (B) | Type parts by mass | CDI - 1 5 | CDI - 1 5 | CDI - 1 5 | CDI - 1 5 | CDI - 1 5 | CDI - 1 5 | CDI - 1 5 | CDI - 1 5 | CDI - 1 1 |
| Monocarbodiimide (B') | Type parts by mass | — 0 | — 0 | — 0 | — 0 | — 0 | — 0 | — 0 | — 0 | — 0 |

TABLE 1-continued

| Step (I-1) | | | | | | | | | | |
|---|---|---|---|---|---|---|---|---|---|---|
| Mixer temperature | °C. | 300 | 300 | 300 | 300 | 300 | 300 | 300 | 300 | 300 |
| Mixer rotation number | rpm | 50 | 50 | 50 | 50 | 50 | 50 | 50 | 50 | 50 |
| Melt-kneading time | sec | 300 | 3600 | 300 | 300 | 300 | 300 | 300 | 45 | 300 |
| Pressure reduction degree | MPa | 0 | 0 | 0 | 0 | 0 | 0 | 0 | 0 | 0 |
| t1 *1 | sec | 30 | 30 | 30 | 30 | 30 | 30 | 30 | 30 | 30 |
| t2 *2 | sec | 270 | 3570 | 270 | 270 | 270 | 270 | 270 | 15 | 270 |
| Step (II-1) | | | | | | | | | | |
| Press temperature | °C. | 250 | 50 | 250 | 250 | 200 | 150 | 50 | 250 | 250 |
| Press pressure | MPa | 0.5 | 0.5 | 0.5 | 0.5 | 0.5 | 0.5 | 0.5 | 0.5 | 0.5 |
| Press time | sec | 3600 | 300 | 1800 | 900 | 3600 | 3600 | 3600 | 3600 | 3600 |
| Step (III-1) | | | | | | | | | | |
| Press temperature | °C. | 300 | 300 | 300 | 300 | 300 | 300 | 300 | 300 | 300 |
| Press pressure | MPa | 3 | 3 | 3 | 3 | 3 | 3 | 3 | 3 | 3 |
| Press time | sec | 180 | 180 | 180 | 180 | 180 | 180 | 180 | 180 | 180 |
| Carbon fibers (D) | Type | CF-1 | CF-1 | CF-1 | CF-1 | CF-1 | CF-1 | CF-1 | CF-1 | CF-1 |
| | parts by mass | 45 | — | 45 | 45 | 45 | 45 | 45 | 45 | 45 |
| Component (E) | Type | E-1 | E-1 | E-1 | E-1 | E-1 | E-1 | E-1 | E-1 | E-1 |
| | parts by mass | 0.45 | — | 0.45 | 0.45 | 0.45 | 0.45 | 0.45 | 0.45 | 0.45 |
| Step (IV) | | | | | | | | | | |
| Press temperature | °C. | — | — | — | — | — | — | — | — | — |
| Press pressure | MPa | — | — | — | — | — | — | — | — | — |
| Press time | sec | — | — | — | — | — | — | — | — | — |
| (Evaluation of characteristics) | | | | | | | | | | |
| Bleed test | — | excellent | — | Excellent | good | excellent | good | bad | good | excellent |
| Tensile elastic Modulus | GPa | 29 | — | 29 | 28 | 29 | 28 | 28 | 27 | 29 |
| Tensile strength | MPa | 330 | — | 330 | 320 | 330 | 320 | 310 | 300 | 310 |
| Tensile elongation | % | 1.2 | — | 1.2 | 1.2 | 1.2 | 1.2 | 1.2 | 1.1 | 1.2 |

| | Comparative Example 3 | Comparative Example 4 | Comparative Example 5 | Example 8 | Example 9 | Example 10 | Example 11 | Example 12 | Example 13 | Example 14 |
|---|---|---|---|---|---|---|---|---|---|---|
| | PPS-1 | PPS-1 | PPS-1 | PPS-1 | PPS-1 | PPS-1 | PPS-1 | PPS-1 | PPS-1 | PPS-1 |
| | 100 | 100 | 100 | 100 | 100 | 100 | 100 | 100 | 100 | 100 |
| | — | CDI-1 | — | CDI-1 | CDI-1 | CDI-1 | CDI-1 | CDI-1 | CDI-1 | CDI-1 |
| | 0 | 20 | 0 | 5 | 5 | 5 | 5 | 5 | 5 | 5 |
| | — | — | CDI-2 | — | — | — | — | — | — | — |
| | 0 | 0 | 5 | 0 | 0 | 0 | 0 | 0 | 0 | 0 |
| | 300 | 300 | 300 | 300 | 300 | 300 | 300 | 300 | 300 | 300 |
| | 50 | 50 | 50 | 50 | 50 | 50 | 50 | 50 | 50 | 50 |
| | 300 | 300 | 300 | 300 | 300 | 300 | 300 | 300 | 300 | 300 |
| | 0 | 0 | 0 | 0 | 0 | 0 | 0 | 0 | −0.10 | 0 |
| | 30 | 30 | 30 | 30 | 30 | 30 | 30 | 30 | 30 | 30 |
| | 270 | 270 | 270 | 270 | 270 | 270 | 270 | 270 | 270 | 270 |
| | 250 | 250 | 250 | 250 | 250 | 250 | 250 | 250 | 250 | 250 |
| | 0.5 | 0.5 | 0.5 | 0.5 | 0.5 | 0.5 | 0.5 | 0.5 | 0.5 | 0.5 |
| | 3600 | 3600 | 3600 | 3600 | 3600 | 3600 | 3600 | 3600 | 900 | 900 |
| | 300 | 300 | 300 | 300 | 300 | 300 | 300 | 300 | 300 | 300 |
| | 3 | 3 | 3 | 3 | 3 | 3 | 3 | 3 | 3 | 3 |
| | 180 | 180 | 180 | 180 | 180 | 180 | 180 | 180 | 180 | 180 |
| | CF-1 | CF-1 | CF-1 | CF-1 | CF-1 | CF-1 | CF-1 | CF-1 | CF-1 | CF-1 |
| | 45 | 45 | 45 | 25 | 100 | 45 | 45 | 45 | 45 | 45 |
| | E-1 | E-1 | E-1 | E-1 | E-1 | E-2 | E-3 | — | E-1 | E-1 |
| | 0.45 | 0.45 | 0.45 | 0.25 | 1.00 | 0.45 | 0.45 | 0 | 0.45 | 0.45 |
| | — | — | — | — | — | — | — | — | — | 250 |
| | — | — | — | — | — | — | — | — | — | 0.5 |
| | — | — | — | — | — | — | — | — | — | 3600 |
| | excellent | bad | bad | excellent | Excellent | excellent | excellent | excellent | excellent | excellent |
| | 30 | 24 | 28 | 19 | 42 | 28 | 28 | 28 | 28 | 28 |
| | 280 | 260 | 290 | 310 | 300 | 315 | 310 | 290 | 320 | 330 |
| | 1.0 | 0.6 | 1.0 | 1.4 | 0.6 | 1.2 | 1.2 | 1.1 | 1.2 | 1.2 |

*1 t1: time required for melting component (A) and component (B) or (B')
*2 t2: time remaining after melting component (A) and component (B) or (B')

The results in Examples and Comparative Examples in Table 1 show the following.

Example 1 satisfies all the requirements of the steps (I-1) to (III-1), therefore secures both dynamic characteristics and molding cycle characteristics, and is excellent in productivity of the carbon fiber-reinforced polyarylene sulfide.

In Comparative Example 1, the melt-kneading time in the step (I-1) was long and, therefore, although the heating temperature was low and the heating time was short in the step (II-1), combination of the polycarbodiimide-modified polyarylene sulfide (C-1) with the carbon fibers (D) in the step (III-1) was difficult.

A comparison among Examples 1 to 3 shows that as the time during which heating is performed at a temperature equal to or higher than the glass transition temperature and equal to or lower than the melting point of the PAS (A) in the step (II-1) increases, bleeding components in the resulting carbon fiber-reinforced polyarylene sulfide decrease so that molding cycle characteristics are improved.

A comparison between Examples 1, 4 and 5 and Comparative Example 2 shows that when heating is performed at a temperature equal to or higher than the glass transition temperature and equal to or lower than the melting point of the PAS (A) in the step (II-1), bleeding components in the resulting carbon fiber-reinforced polyarylene sulfide decrease so that molding cycle characteristics are improved.

A comparison between Example 1 and Example 6 shows that when t1 is smaller than t2 in the step (I-1), bleeding components in the resulting carbon fiber-reinforced polyarylene sulfide decrease so that molding cycle characteristics are improved.

A comparison between Examples 1 and 7 and Comparative Examples 3 and 4 shows that when the amount of the polycarbodiimide (B) is 0.1 to 10 parts by mass based on 100 parts by mass of the PAS (A), a carbon fiber-reinforced polyarylene sulfide having both dynamic characteristics and molding cycle characteristics is obtained.

A comparison between Example 1 and Comparative Example 5 shows that when the polycarbodiimide (B) having at least two carbodiimide groups in one molecule is used, a carbon fiber-reinforced polyarylene sulfide having both dynamic characteristics and molding cycle characteristics is obtained.

Examples 1, 8 and 9 show that even when the amount of the carbon fibers (D) is changed, a carbon fiber-reinforced polyarylene sulfide having both dynamic characteristics and molding cycle characteristics is obtained.

A comparison between Examples 1, 10 and 11 and Example 12 shows that when the component (E) is used, a carbon fiber-reinforced polyarylene sulfide further excellent in dynamic characteristics is obtained.

A comparison between Example 13 and Example 3 shows that when melt-kneading in the step (I-1) is performed under a reduced-pressure condition, bleeding components in the resulting carbon fiber-reinforced polyarylene sulfide decrease so that molding cycle characteristics are improved.

A comparison between Example 14 and Example 3 shows that when as the step (IV), the carbon fiber-reinforced polyarylene sulfide prepared in the step (III-1) is heated at a temperature equal to or higher than the glass transition temperature and equal to or lower than the melting point of the PAS (A), bleeding components in the resulting carbon fiber-reinforced polyarylene sulfide decrease so that molding cycle characteristics are improved.

Reference Example 5

As the step (I-2), the polycarbodiimide (B) was heated in a hot air oven with the heating temperature and heating time described in Table 2, thereby preparing CDI-3 as the polycarbodiimide reaction product (B-2). The heat-resistant temperature of the obtained CDI-3 was measured using a thermogravimetric analyzer. Evaluation results are described in Table 2.

Reference Example 6

Except that the heating temperature was changed to 200° C., and the heating time was changed to 2 hours, the same procedure as in Reference Example 5 was carried out to heat the polycarbodiimide (B), thereby preparing CDI-4 as the polycarbodiimide reaction product (B-2). The heat-resistant temperature of the obtained CDI-4 was measured using a thermogravimetric analyzer. Evaluation results are described in Table 2.

Reference Example 7

Except that the heating temperature was changed to 300° C., and the heating time was changed to 0.5 hours, the same procedure as in Reference Example 5 was carried out to heat the polycarbodiimide (B), thereby preparing CDI-5 as the polycarbodiimide reaction product (B-2). The heat-resistant temperature of the obtained CDI-5 was measured using a thermogravimetric analyzer. Evaluation results are described in Table 2.

Reference Example 8

Except that a vacuum oven and a vacuum pump were used in place of the hot air oven, and the pressure reduction degree of the inside of the vacuum oven was adjusted to −0.1 MPa, the same procedure as in Reference Example 5 was carried out to heat the polycarbodiimide (B), thereby preparing CDI-6 as the polycarbodiimide reaction product (B-2). The heat-resistant temperature of the obtained CDI-6 was measured using a thermogravimetric analyzer. Evaluation results are described in Table 2.

Reference Example 9

Except that the heating temperature was changed to 100° C., and the heating time was changed to 1 hour, the same procedure as in Reference Example 5 was carried out to heat the polycarbodiimide (B), thereby preparing CDI-7 as the polycarbodiimide reaction product (B-2). The heat-resistant temperature of the obtained CDI-7 was measured using a thermogravimetric analyzer. Evaluation results are described in Table 2.

Reference Example 10

An attempt was made to perform heating by carrying out the same procedure as in Reference Example 5 except that as described in Table 2, CDI-2 as the monocarbodiimide (B') was used in place of CDI-1 as the polycarbodiimide (B), but CDI-2 was volatilized, and thus a reaction product including a monocarbodiimide was not obtained.

Reference Example 11

The heat-resistant temperature of CDI-1 as the polycarbodiimide (B) was measured using a thermogravimetric analyzer. Evaluation results are described in Table 2.

TABLE 2

|  |  | Reference Example 5 | Reference Example 6 | Reference Example 7 | Reference Example 8 | Reference Example 9 | Reference Example 10 | Reference Example 11 |
|---|---|---|---|---|---|---|---|---|
| Step (I-2) | | | | | | | | |
| Polycarbodiimide (B) | Type | CDI - 1 | CDI - 1 | CDI - 1 | CDI - 1 | CDI - 1 | — | CDI - 1 |
| Monocarbodiimide (B') | Type | — | — | — | — | — | CDI - 2 | — |
| Heating temperature of polycarbodiimide (B) | °C. | 120 | 200 | 300 | 120 | 100 | 120 | — |
| Heating time of polycarbodiimide (B) | h | 20 | 2 | 0.5 | 20 | 1 | 20 | — |
| Pressure reduction degree | MPa | 0 | 0 | 0 | −0.1 | 0 | 0 | — |
| Polycarbodiimide reaction product (B-2) | Type | CDI - 3 | CDI - 4 | CDI - 5 | CDI - 6 | CDI - 7 | — | — |
| Heat-resistant temperature of polycarbodiimide reaction product (B-2) *1 | °C. | 365 | 360 | 370 | 370 | 350 | — | 340 |

*1 Temperature at which the mass of the sample decreased by 5% by mass with respect to the mass at 30° C. at the time of performing thermogravimetric analysis at a temperature elevation rate of 20° C./minute from 30° C. to 400° C. under an air atmosphere.

Example 15

Using the components and conditions shown in Table 3, a carbon fiber-reinforced polyarylene sulfide was produced by the second production method according to one example in accordance with the following procedure, and evaluated.

Step (II-2): The PAS (A) and the polycarbodiimide reaction product (B-2) were main-fed to a twin-screw extruder (TEX-30α from JSW, Inc., (screw length)/(screw diameter)=31.5) to be melt-kneaded. Melt-kneading was performed at a cylinder temperature of 300° C., and the time required for discharging the components after main-feeding the components (melt-kneading time) was 150 seconds. The melt-kneaded product was discharged from a T die mounted at the head of a twin-screw extruder, and cooled with a cooling roll to prepare a film including the polycarbodiimide-modified polyarylene sulfide (C-2).

Step (III-2): The obtained film was cut to a predetermined size, laminated alternately with the carbon fiber base material (CFM-2) in the form of a nonwoven fabric, and the resulting laminate was fed to a press molding machine to produce a carbon fiber-reinforced polyarylene sulfide.

Test pieces were cut out from the obtained carbon fiber-reinforced polyarylene sulfide, and subjected to tests. Evaluation results are described in Table 3.

Example 16

Except that CDI-4 was used as the polycarbodiimide reaction product (B-2), the same procedure as in Example 15 was carried out to prepare test pieces, and the test pieces were subjected to evaluations. Evaluation results are described in Table 3.

Example 17

Except that CDI-5 was used as the polycarbodiimide reaction product (B-2), the same procedure as in Example 15 was carried out to prepare test pieces, and the test pieces were subjected to evaluations. Evaluation results are described in Table 3.

Example 18

Except that CDI-6 was used as the polycarbodiimide reaction product (B-2), the same procedure as in Example 15 was carried out to prepare test pieces, and the test pieces were subjected to evaluations. Evaluation results are described in Table 3.

Example 19

Except that CDI-7 was used as the polycarbodiimide reaction product (B-2), the same procedure as in Example 15 was carried out to prepare test pieces, and the test pieces were subjected to evaluations. Evaluation results are described in Table 3.

Example 20

Except that as the step (IV), the carbon fiber-reinforced polyarylene sulfide prepared in the step (III-2) was fed to the press molding machine again, and heated under the conditions of a press temperature of 250° C., a press pressure of 0.5 MPa and a press time of 3600 seconds, the same procedure as in Example 19 was carried out to prepare test pieces, and the test pieces were subjected to evaluations. Evaluation results are described in Table 3.

Comparative Example 6

Except that the polycarbodiimide reaction product (B-2) was not included, the same procedure as in Example 15 was carried out to prepare test pieces, and the test pieces were subjected to evaluations. Evaluation results are described in Table 3.

Comparative Example 7

Except that the CDI-2 as the monocarbodiimide (B') was used in place of the polycarbodiimide reaction product (B-2), the same procedure as in Example 15 was carried out to prepare test pieces, and the test pieces were subjected to evaluations. Evaluation results are described in Table 3.

Example 21

Except that the content of the carbon fiber base material (CFM-2) in the form of a nonwoven fabric was changed so that the content of the carbon fibers (D) was 25 parts by mass based on 100 parts by mass of the PAS (A) while the deposition amount of the component (E) was 1 part by mass based on 100 parts by mass of the carbon fibers (D), the same procedure as in Example 15 was carried out to prepare test pieces, and the test pieces were subjected to evaluations. Evaluation results are described in Table 3.

Example 22

Except that the content of the carbon fiber base material (CFM-2) in the form of a nonwoven fabric was changed so that the content of the carbon fibers (D) was 100 parts by mass based on 100 parts by mass of the PAS (A) while the deposition amount of the component (E) was 1 part by mass based on 100 parts by mass of the carbon fibers (D), the same procedure as in Example 15 was carried out to prepare test pieces, and the test pieces were subjected to evaluations. Evaluation results are described in Table 3.

Example 23

Except that the component (E) was not included, and accordingly the carbon fiber base material (CFM-1) in the form of a nonwoven fabric was used, the same procedure as in Example 15 was carried out to prepare test pieces, and the test pieces were subjected to evaluations. Evaluation results are described in Table 3.

TABLE 3

|  |  | Example 15 | Example 16 | Example 17 | Example 18 | Example 19 | Example 20 |
|---|---|---|---|---|---|---|---|
| Step (II-2) | | | | | | | |
| Polyarylene sulfide (A) | Type | PPS - 1 | PPS - 1 | PPS - 1 | PPS - 1 | PPS - 1 | PPS - 1 |
| | parts by mass | 100 | 100 | 100 | 100 | 100 | 100 |
| Polycarbodiimide reaction product (B-2) | Type | CDI - 3 | CDI - 4 | CDI - 5 | CDI - 6 | CDI - 7 | CDI - 7 |
| | parts by mass | 5 | 5 | 5 | 5 | 5 | 5 |
| Monocarbodiimide (B') | Type | — | — | — | — | — | — |
| | parts by mass | 0 | 0 | 0 | 0 | 0 | 0 |
| Cylinder temperature | ° C. | 300 | 300 | 300 | 300 | 300 | 300 |
| Melt-kneading time | Sec | 150 | 150 | 150 | 150 | 150 | 150 |
| Step (III-2) | | | | | | | |
| Press temperature | ° C. | 300 | 300 | 300 | 300 | 300 | 300 |
| Press pressure | MPa | 3 | 3 | 3 | 3 | 3 | 3 |
| Press time | Sec | 180 | 180 | 180 | 180 | 180 | 180 |
| Carbon fibers (D) | Type | CF - 1 | CF - 1 | CF - 1 | CF - 1 | CF - 1 | CF - 1 |
| | parts by mass | 45 | 45 | 45 | 45 | 45 | 45 |
| Component (E) | Type | E - 1 | E - 1 | E - 1 | E - 1 | E - 1 | E - 1 |
| | parts by mass | 0.45 | 0.45 | 0.45 | 0.45 | 0.45 | 0.45 |
| Step (IV) | | | | | | | |
| Press temperature | ° C. | — | — | — | — | — | 250 |
| Press pressure | MPa | — | — | — | — | — | 0.5 |
| Press time | Sec | — | — | — | — | — | 3600 |
| (Evaluation of characteristics) | | | | | | | |
| Bleed test | — | excellent | excellent | excellent | excellent | good | excellent |
| Tensile elastic modulus | GPa | 29 | 29 | 29 | 29 | 29 | 29 |
| Tensile strength | MPa | 330 | 320 | 290 | 330 | 320 | 330 |
| Tensile elongation | % | 1.2 | 1.1 | 1.1 | 1.2 | 1.1 | 1.2 |

|  |  | Comparative Example 6 | Comparative Example 7 | Example 21 | Example 22 | Example 23 |
|---|---|---|---|---|---|---|
| Step (II-2) | | | | | | |
| Polyarylene sulfide (A) | Type | PPS - 1 | PPS - 1 | PPS - 1 | PPS - 1 | PPS - 1 |
| | parts by mass | 100 | 100 | 100 | 100 | 100 |
| Polycarbodiimide reaction product (B-2) | Type | — | — | CDI - 3 | CDI - 3 | CDI - 3 |
| | parts by mass | 0 | 0 | 5 | 5 | 5 |
| Monocarbodiimide (B') | Type | — | CDI - 2 | — | — | — |
| | parts by mass | 0 | 5 | 0 | 0 | 0 |
| Cylinder temperature | ° C. | 300 | 300 | 300 | 300 | 300 |
| Melt-kneading time | Sec | 150 | 150 | 150 | 150 | 150 |
| Step (III-2) | | | | | | |
| Press temperature | ° C. | 300 | 300 | 300 | 300 | 300 |
| Press pressure | MPa | 3 | 3 | 3 | 3 | 3 |

TABLE 3-continued

| | | | | | | |
|---|---|---|---|---|---|---|
| Press time | Sec | 180 | 180 | 180 | 180 | 180 |
| Carbon fibers (D) | Type parts by mass | CF - 1 45 | CF - 1 45 | CF - 1 25 | CF - 1 100 | CF - 1 45 |
| Component (E) | Type parts by mass | E - 1 0.45 | E - 1 0.45 | E - 1 0.25 | E - 1 1.00 | — 0 |
| Step (IV) | | | | | | |
| Press temperature | °C. | — | — | — | — | — |
| Press pressure | MPa | — | — | — | — | — |
| Press time | Sec | — | — | — | — | — |
| (Evaluation of characteristics) | | | | | | |
| Bleed test | — | excellent | bad | excellent | excellent | excellent |
| Tensile elastic modulus | GPa | 30 | 28 | 19 | 42 | 28 |
| Tensile strength | MPa | 280 | 290 | 305 | 300 | 290 |
| Tensile elongation | % | 1.0 | 1.0 | 1.4 | 0.6 | 1.1 |

The results in Reference Examples in Table 2 and Examples and Comparative Examples in Table 3 show the following.

A comparison between Reference Examples 5 to 8 and Reference Example 11 shows that when the polycarbodiimide (B) satisfies the requirement of the step (I-2), heat resistance is improved.

A comparison between Reference Examples 5 to 8 and Reference Example 10 shows that when the monocarbodiimide (B') is used in place of the polycarbodiimide (B), heat resistance is insufficient.

Example 15 satisfies all the requirements of the steps (I-2) to (III-2), and secures both dynamic characteristics and molding cycle characteristics, and is excellent in productivity of the carbon fiber-reinforced polyarylene sulfide.

A comparison among Examples 15 to 18 shows that as the temperature at which the polycarbodiimide (B) is heated at a temperature equal to or higher than the softening point of the component in the step (II-2) decreases within the bounds of the specified conditions, the dynamic characteristics of the resulting carbon fiber-reinforced polyarylene sulfide can be improved.

A comparison between Example 19 and Example 20 shows that when as the step (IV), the carbon fiber-reinforced polyarylene sulfide prepared in the step (III-2) is heated at a temperature equal to or higher than the glass transition temperature and equal to or lower than the melting point of the PAS (A), bleeding components in the resulting carbon fiber-reinforced polyarylene sulfide decrease so that molding cycle characteristics are improved.

A comparison between Example 15 and Comparative Examples 6 and 7 shows that when the polycarbodiimide reaction product (B-2) is used, a carbon fiber-reinforced polyarylene sulfide having both dynamic characteristics and molding cycle characteristics is obtained.

Examples 15, 21 and 22 show that even when the amount of the carbon fibers (D) is changed, a carbon fiber-reinforced polyarylene sulfide having both dynamic characteristics and molding cycle characteristics is obtained.

A comparison between Example 15 and Example 23 shows that when the component (E) is used, a carbon fiber-reinforced polyarylene sulfide further excellent in dynamic characteristics is obtained.

Example 24

Using the components and conditions shown in Table 4, a carbon fiber-reinforced polyarylene sulfide was produced by the third production method according to one example in accordance with the following procedure, and evaluated.

Step (I-3): A mixture was obtained by dry-blending the PAS (A) and the polycarbodiimide (B).

Step (II-3): The obtained mixture was main-fed to a twin-screw extruder (TEX-30α from JSW, Inc., (screw length)/(screw diameter)=31.5) to be melt-kneaded. Melt-kneading was performed at a cylinder temperature of 350° C., and the time required for discharging the components after main-feeding the components (melt-kneading time) was 300 seconds. The melt-kneaded product was discharged from a T die mounted at the head of a twin-screw extruder, and cooled with a cooling roll to prepare a film including the polycarbodiimide-modified polyarylene sulfide (C-3).

Step (III-3): The obtained film was cut to a predetermined size, laminated alternately with the carbon fiber base material (CFM-2) in the form of a nonwoven fabric, and the resulting laminate was fed to a press molding machine to produce a carbon fiber-reinforced polyarylene sulfide.

Test pieces were cut out from the obtained carbon fiber-reinforced polyarylene sulfide, and subjected to tests. Evaluation results are described in Table 4.

Example 25

Except that the cylinder temperature of the twin-screw extruder in the step (II-3) was changed to 330° C., the same procedure as in Example 24 was carried out to prepare test pieces, and the test pieces were subjected to evaluations. Evaluation results are described in Table 4.

Example 26

Except that as the step (IV), the carbon fiber-reinforced polyarylene sulfide prepared in the step (III-3) was fed to the press molding machine again, and heated under the conditions of a press temperature of 250° C., a press pressure of 0.5 MPa and a press time of 3600 seconds, the same procedure as in Example 25 was carried out to prepare test pieces, and the test pieces were subjected to evaluations. Evaluation results are described in Table 4.

Comparative Example 8

Except that the cylinder temperature of the twin-screw extruder in the step (II-3) was changed to 300° C., and the press temperature in the step (III-3) was changed to 350° C., the same procedure as in Example 24 was carried out to prepare test pieces, and the test pieces were subjected to evaluations. Evaluation results are described in Table 4.

Comparative Example 9

An attempt was made to prepare test pieces by carrying out the same procedure as in Example 24 except that the press temperature in the step (III-3) was changed to 420° C., but combination of the polycarbodiimide-modified polyarylene sulfide (C-3) with the carbon fibers (D) in the step (III-3) was difficult, and thus a carbon fiber-reinforced polyarylene sulfide was not obtained. Evaluation results are described in Table 4.

Comparative Example 10

Except that the polycarbodiimide (B) was not included, the same procedure as in Example 24 was carried out to prepare test pieces, and the test pieces were subjected to evaluations. Evaluation results are described in Table 4.

Comparative Example 11

Except that the amount of the polycarbodiimide (B) was changed to 20 parts by mass based on 100 parts by mass of the PAS (A), the same procedure as in Example 24 was carried out to prepare test pieces, and the test pieces were subjected to evaluations. Evaluation results are described in Table 4.

Comparative Example 12

Except that the CDI-2 as the monocarbodiimide (B') was used in place of the polycarbodiimide (B), the same procedure as in Example 24 was carried out to prepare test pieces, and the test pieces were subjected to evaluations. Evaluation results are described in Table 4.

Example 27

Except that the content of the carbon fiber base material (CFM-2) in the form of a nonwoven fabric was changed so that the content of the carbon fibers (D) was 25 parts by mass based on 100 parts by mass of the PAS (A) while the deposition amount of the component (E) was 1 part by mass based on 100 parts by mass of the carbon fibers (D), the same procedure as in Example 24 was carried out to prepare test pieces, and the test pieces were subjected to evaluations. Evaluation results are described in Table 4.

Example 28

Except that the content of the carbon fiber base material (CFM-2) in the form of a nonwoven fabric was changed so that the content of the carbon fibers (D) was 100 parts by mass based on 100 parts by mass of the PAS (A) while the deposition amount of the component (E) was 1 part by mass based on 100 parts by mass of the carbon fibers (D), the same procedure as in Example 24 was carried out to prepare test pieces, and the test pieces were subjected to evaluations. Evaluation results are described in Table 4.

Example 29

Except that the component (E) was not included, and accordingly the carbon fiber base material (CFM-1) in the form of a nonwoven fabric was used, the same procedure as in Example 24 was carried out to prepare test pieces, and the test pieces were subjected to evaluations. Evaluation results are described in Table 4.

TABLE 4

| | | Example 24 | Example 25 | Example 26 | Comparative Example 8 | Comparative Example 9 | Comparative Example 10 |
|---|---|---|---|---|---|---|---|
| Step (I-3) | | | | | | | |
| Polyarylene sulfide (A) | Type | PPS - 1 | PPS - 1 | PPS - 1 | PPS - 1 | PPS - 1 | PPS - 1 |
| | parts by mass | 100 | 100 | 100 | 100 | 100 | 100 |
| Polycarbodiimide (B) | Type | CDI - 1 | CDI - 1 | CDI - 1 | CDI - 1 | CDI - 1 | — |
| | parts by mass | 5 | 5 | 5 | 5 | 5 | 0 |
| Monocarbodiimide (B') | Type | — | — | — | — | — | — |
| | parts by mass | 0 | 0 | 0 | 0 | 0 | 0 |
| Step (II-3) | | | | | | | |
| Cylinder temperature | ° C. | 350 | 330 | 330 | 300 | 350 | 350 |
| Melt-kneading time | Sec | 300 | 300 | 300 | 300 | 300 | 300 |
| Step (III-3) | | | | | | | |
| Press temperature | ° C. | 300 | 300 | 300 | 350 | 420 | 300 |
| Press pressure | MPa | 3 | 3 | 3 | 3 | 3 | 3 |
| Press time | Sec | 180 | 180 | 180 | 180 | 180 | 180 |
| Carbon fibers (D) | Type | CF - 14 | CF - 14 | CF - 14 | CF - 14 | CF - 1 | CF - 1 |
| | parts by mass | 5 | 5 | 5 | 5 | — | 45 |
| Component (E) | Type | E - 1 | E - 1 | E - 1 | E - 1 | E - 1 | E - 1 |
| | parts by mass | 0.45 | 0.45 | 0.45 | 0.45 | — | 0.45 |
| Step (IV) | | | | | | | |
| Press temperature | ° C. | — | — | 250 | — | — | — |
| Press pressure | MPa | — | — | 0.5 | — | — | — |
| Press time | Sec | — | — | 3600 | — | — | — |
| (Evaluation of characteristics) | | | | | | | |
| Bleed test | — | Good | good | excellent | Bad | — | excellent |
| Tensile elastic modulus | GPa | 29 | 28 | 29 | 28 | — | 30 |

TABLE 4-continued

| | | | | | | | |
|---|---|---|---|---|---|---|---|
| Tensile strength | MPa | 330 | 320 | 330 | 320 | — | 280 |
| Tensile elongation | % | 1.2 | 1.2 | 1.2 | 1.2 | — | 1.0 |

| | | Comparative Example 11 | Comparative Example 12 | Example 27 | Example 28 | Example 29 |
|---|---|---|---|---|---|---|
| Step (I-3) | | | | | | |
| Polyarylene sulfide (A) | Type parts by mass | PPS - 1 100 | PPS - 1 100 | PPS - 1 100 | PPS - 1 100 | PPS - 1 100 |
| Polycarbodiimide (B) | Type parts by mass | CDI - 1 20 | — 0 | CDI - 1 5 | CDI - 1 5 | CDI - 1 5 |
| Monocarbodiimide (B') | Type parts by mass | — 0 | CDI - 2 5 | — 0 | — 0 | — 0 |
| Step (II-3) | | | | | | |
| Cylinder temperature | °C. | 350 | 350 | 350 | 350 | 350 |
| Melt-kneading time | Sec | 300 | 300 | 300 | 300 | 300 |
| Step (III-3) | | | | | | |
| Press temperature | °C. | 300 | 300 | 300 | 300 | 300 |
| Press pressure | MPa | 3 | 3 | 3 | 3 | 3 |
| Press time | Sec | 180 | 180 | 180 | 180 | 180 |
| Carbonfibers (D) | Type parts by mass | CF - 1 45 | CF - 1 45 | CF - 1 25 | CF - 1 100 | CF - 1 45 |
| Component (E) | Type parts by mass | E - 1 0.45 | E - 1 0.45 | E - 1 0.25 | E - 1 1.00 | — 0 |
| Step (IV) | | | | | | |
| Press temperature | °C. | — | — | — | — | — |
| Press pressure | MPa | — | — | — | — | — |
| Press time (Evaluation of characteristics) | Sec | — | — | — | — | — |
| Bleed test | — | bad | bad | good | good | good |
| Tensile elastic modulus | GPa | 25 | 28 | 20 | 42 | 28 |
| Tensile strength | MPa | 270 | 280 | 310 | 300 | 290 |
| Tensile elongation | % | 0.6 | 0.9 | 1.3 | 0.6 | 1.1 |

The results in Examples and Comparative Examples in Table 4 show the following.

Examples 24 and 25 satisfy all the requirements of the steps (I-3) to (III-3), therefore secure both dynamic characteristics and molding cycle characteristics, and are excellent in productivity of the carbon fiber-reinforced polyarylene sulfide.

A comparison between Example 25 and Example 26 shows that when as the step (IV), the carbon fiber-reinforced polyarylene sulfide prepared in the step (III-3) is heated at a temperature equal to or higher than the glass transition temperature and equal to or lower than the melting point of the PAS (A), bleeding components in the resulting carbon fiber-reinforced polyarylene sulfide decrease so that molding cycle characteristics are improved.

A comparison between Examples 24 and 25 and Comparative Example 8 shows that Comparative Example 8 does not satisfy the requirement of the step (III-3) and, therefore, the resulting carbon fiber-reinforced polyarylene sulfide is poor in molding cycle characteristics.

In Comparative Example 9, the step (III-3) was carried out at a high temperature of 400° C. or higher and, therefore, combination of the polycarbodiimide-modified polyarylene sulfide (C-3) with the carbon fibers (D) was difficult.

A comparison between Example 24 and Comparative Examples 10 and 11 shows that when the amount of the polycarbodiimide (B) is 0.1 to 10 parts by mass based on 100 parts by mass of the PAS (A), a carbon fiber-reinforced polyarylene sulfide having both dynamic characteristics and molding cycle characteristics is obtained.

A comparison between Example 24 and Comparative Example 12 shows that when the polycarbodiimide (B) having at least two carbodiimide groups in one molecule is used, a carbon fiber-reinforced polyarylene sulfide having both dynamic characteristics and molding cycle characteristics is obtained.

Examples 24, 27 and 28 show that even when the amount of the carbon fibers (D) is changed, a carbon fiber-reinforced polyarylene sulfide having both dynamic characteristics and molding cycle characteristics is obtained.

A comparison between Example 24 and Example 29 shows that when the component (E) is used, a carbon fiber-reinforced polyarylene sulfide further excellent in dynamic characteristics is obtained.

Example 30

Using the components and conditions shown in Table 5, a carbon fiber-reinforced polyarylene sulfide was produced by the first production method according to one example in accordance with the following procedure, and evaluated.

As the step (V), the composite prepared in the step (III-1) in Example 1 was cut into a pellet having an average particle size of 5 mm, and test pieces were prepared by injection-molding the pellet using an injection molding machine (J150EII-P manufactured by JSW, Inc.). The injection molding was performed at a cylinder temperature of 300° C. and a die temperature of 150° C., and the maximum pressure in injection molding was defined as an injection molding pressure. Evaluation results were described in Table 5.

Example 31

Except that the composite prepared in the step (III-1) in Example 3 was used, the same procedure as in Example 30 was carried out to prepare test pieces, and the test pieces were subjected to evaluations. Evaluation results are described in Table 5.

Example 32

Except that the cylinder temperature in injection molding in the step (V) was changed to 290° C., the same procedure as in Example 31 was carried out to prepare test pieces, and the test pieces were subjected to evaluations. Evaluation results are described in Table 5.

Example 33

Except that the cylinder temperature in injection molding in the step (V) was changed to 350° C., the same procedure as in Example 31 was carried out to prepare test pieces, and the test pieces were subjected to evaluations. Evaluation results are described in Table 5.

Example 34

Except that the composite prepared in the step (IV) in Example 14 was used, the same procedure as in Example 30 was carried out to prepare test pieces, and the test pieces were subjected to evaluations. Evaluation results are described in Table 5.

Example 30 satisfies the requirements of the steps (I-1) to (III-1) and the step (V) and, therefore, secures both dynamic characteristics and molding cycle characteristics, and is excellent in productivity of the carbon fiber-reinforced polyarylene sulfide.

Example 34 satisfies the requirements of the steps (I-1) to (III-1), the step (IV) and the step (V) and, therefore, secures both dynamic characteristics and molding cycle characteristics, and is excellent in productivity of the carbon fiber-reinforced polyarylene sulfide.

A comparison among Examples 31, 32 and 33 shows that when in the step (V), injection molding is performed at a molding processing temperature lower than the temperature in preparation of a composite in the step (III-1), bleeding components in the resulting carbon fiber-reinforced polyarylene sulfide decrease so that molding cycle characteristics are improved.

Example 35

Using the components and conditions shown in Table 6, a carbon fiber-reinforced polyarylene sulfide was produced by the second production method according to one example in accordance with the following procedure, and evaluated.

As the step (V), the composite prepared in the step (III-2) in Example 15 was cut into a pellet having an average particle size of 5 mm. Using an injection molding machine (J150EII-P manufactured by JSW, Inc.), the pellet was injection-molded to prepare test pieces. The injection molding was performed at a cylinder temperature of 300° C. and a die temperature of 150° C., and the maximum pressure in injection molding was defined as an injection molding pressure. Evaluation results are described in Table 6.

Example 36

Except that the composite prepared in the step (III-2) in Example 19 was used, the same procedure as in Example 35 was carried out to prepare test pieces, and the test pieces were subjected to evaluations. Evaluation results are described in Table 6.

Example 37

Except that the cylinder temperature in injection molding in the step (V) was changed to 290° C., the same procedure as in Example 36 was carried out to prepare test pieces, and the test pieces were subjected to evaluations. Evaluation results are described in Table 6.

Example 38

Except that the cylinder temperature in injection molding in the step (V) was changed to 350° C., the same procedure as in Example 36 was carried out to prepare test pieces, and

TABLE 5

|  |  | Example 30 | Example 31 | Example 32 | Example 33 | Example 34 |
|---|---|---|---|---|---|---|
| Step (V) |  |  |  |  |  |  |
| Composite used | — | Example 1 | Example 3 | Example 3 | Example 3 | Example 14 |
| Cylinder temperature | ° C. | 300 | 300 | 290 | 350 | 300 |
| Die temperature | ° C. | 150 | 150 | 150 | 150 | 150 |
| Injection molding pressure | MPa | 130 | 130 | 140 | 100 | 130 |
| (Evaluation of characteristics) |  |  |  |  |  |  |
| Die contamination | — | excellent | good | excellent | good | excellent |
| Tensile elastic modulus | GPa | 27 | 27 | 27 | 27 | 27 |
| Tensile strength | MPa | 315 | 300 | 300 | 310 | 315 |
| Tensile elongation | % | 1.4 | 1.3 | 1.3 | 1.4 | 1.4 | the test pieces were subjected to evaluations. Evaluation results are described in Table 6.

Example 39

Except that the composite prepared in the step (IV) in Example 20 was used, the same procedure as in Example 35 was carried out to prepare test pieces, and the test pieces were subjected to evaluations. Evaluation results are described in Table 6.

TABLE 6

|  |  | Example 35 | Example 36 | Example 37 | Example 38 | Example 39 |
| --- | --- | --- | --- | --- | --- | --- |
| Step (V) |  |  |  |  |  |  |
| Composite used | — | Example 15 | Example 19 | Example 19 | Example 19 | Example 20 |
| Cylinder temperature | ° C. | 300 | 300 | 290 | 350 | 300 |
| Die temperature | ° C. | 150 | 150 | 150 | 150 | 150 |
| Injection molding pressure | MPa | 130 | 130 | 140 | 100 | 130 |
| (Evaluation of characteristics) |  |  |  |  |  |  |
| Die contamination | — | excellent | good | excellent | good | excellent |
| Tensile elastic modulus | GPa | 28 | 28 | 28 | 28 | 28 |
| Tensile strength | MPa | 310 | 300 | 300 | 300 | 310 |
| Tensile elongation | % | 1.3 | 1.3 | 1.3 | 1.3 | 1.3 |

Example 35 satisfies the requirements of the steps (I-2) to (III-2) and the step (V) and, therefore, secures both dynamic characteristics and molding cycle characteristics, and is excellent in productivity of the carbon fiber-reinforced polyarylene sulfide.

Example 39 satisfies the requirements of the steps (I-2) to (III-2), the step (IV) and the step (V) and, therefore, secures both dynamic characteristics and molding cycle characteristics, and is excellent in productivity of the carbon fiber-reinforced polyarylene sulfide.

A comparison among Examples 36, 37 and 38 shows that when in the step (V), injection molding is performed at a molding processing temperature lower than the temperature in preparation of a composite in the step (III-2), bleeding components in the resulting carbon fiber-reinforced polyarylene sulfide decrease so that molding cycle characteristics are improved.

Example 40

Using the components and conditions shown in Table 7, a carbon fiber-reinforced polyarylene sulfide was produced by the third production method according to one example in accordance with the following procedure, and evaluated.

As the step (V), the composite prepared in the step (III-3) in Example 24 was cut into a pellet having an average particle size of 5 mm. Using an injection molding machine (J150EII-P manufactured by JSW, Inc.), the pellet was injection-molded to prepare test pieces. The injection molding was performed at a cylinder temperature of 300° C. and a die temperature of 150° C., and the maximum pressure in injection molding was defined as an injection molding pressure. Evaluation results are described in Table 7.

Example 41

Except that the composite prepared in the step (III-3) in Example 25 was used, the same procedure as in Example 40 was carried out to prepare test pieces, and the test pieces were subjected to evaluations. Evaluation results are described in Table 7.

Example 42

Except that the cylinder temperature in injection molding in the step (V) was changed to 290° C., the same procedure as in Example 41 was carried out to prepare test pieces, and the test pieces were subjected to evaluations. Evaluation results are described in Table 7.

Example 43

Except that the cylinder temperature in injection molding in the step (V) was changed to 350° C., the same procedure as in Example 41 was carried out to prepare test pieces, and the test pieces were subjected to evaluations. Evaluation results are described in Table 7.

Example 44

Except that the composite prepared in the step (IV) in Example 26 was used, the same procedure as in Example 40 was carried out to prepare test pieces, and the test pieces were subjected to evaluations. Evaluation results are described in Table 7.

TABLE 7

|  |  | Example 40 | Example 41 | Example 42 | Example 43 | Example 44 |
| --- | --- | --- | --- | --- | --- | --- |
| Step (V) |  |  |  |  |  |  |
| Composite used | — | Example 24 | Example 25 | Example 25 | Example 25 | Example 26 |
| Cylinder temperature | ° C. | 300 | 300 | 290 | 350 | 300 |

TABLE 7-continued

|  |  | Example 40 | Example 41 | Example 42 | Example 43 | Example 44 |
|---|---|---|---|---|---|---|
| Die temperature | ° C. | 150 | 150 | 150 | 150 | 150 |
| Injection molding pressure | MPa | 130 | 130 | 140 | 100 | 130 |
| (Evaluation of characteristics) |  |  |  |  |  |  |
| Die contamination | — | good | good | excellent | good | excellent |
| Tensile elastic modulus | GPa | 27 | 27 | 27 | 27 | 27 |
| Tensile strength | MPa | 310 | 300 | 300 | 310 | 310 |
| Tensile elongation | % | 1.4 | 1.4 | 1.4 | 1.4 | 1.4 |

Example 40 satisfies the requirements of the steps (I-3) to (III-3) and the step (V) and, therefore, secures both dynamic characteristics and molding cycle characteristics, and is excellent in productivity of the carbon fiber-reinforced polyarylene sulfide.

Example 44 satisfies the requirements of the steps (I-3) to (III-3), the step (IV) and the step (V) and, therefore, secures both dynamic characteristics and molding cycle characteristics, and is excellent in productivity of the carbon fiber-reinforced polyarylene sulfide.

A comparison among Examples 41, 42 and 43 shows that when in the step (V), injection molding is performed at a molding processing temperature lower than the temperature in preparation of a composite in the step (III-3), bleeding components in the resulting carbon fiber-reinforced polyarylene sulfide decrease so that molding cycle characteristics are improved.

INDUSTRIAL APPLICABILITY

A carbon fiber-reinforced polyarylene sulfide having productivity as well as dynamic characteristics and molding cycle characteristics can be obtained. Accordingly, the carbon fiber-reinforced polyarylene sulfide can be suitably used in electronic device housings, electric and electronic component applications, automobile components, vehicle related components, building materials, sporting goods and so on.

The invention claimed is:

1. A method of producing a carbon fiber-reinforced polyarylene sulfide, comprising:
    (I-1) mixing 100 parts by mass of a polyarylene sulfide (A) and 0.1 to 10 parts by mass of a polycarbodiimide (B) having at least two carbodiimide groups in one molecule, and heating and melt-kneading the resulting mixture to prepare a melt-kneaded product;
    (II-1) heating the melt-kneaded product at a temperature equal to or higher than the glass transition temperature and equal to or lower than the melting point of the polyarylene sulfide (A) to accelerate reaction of the carbodiimide groups in the melt-kneaded product to prepare a polycarbodiimide-modified polyarylene sulfide (C-1); and
    (III-1) melting the polycarbodiimide-modified polyarylene sulfide (C-1), and combining the polycarbodiimide-modified polyarylene sulfide (C-1) with 10 to 300 parts by mass of carbon fibers (D) based on 100 parts by mass of the polyarylene sulfide (A) to prepare a composite,
    wherein step (III-1) impregnates a base material composed of the carbon fibers (D) with the melted component (C-1).

2. The method according to claim 1, wherein the time required until the polyarylene sulfide (A) and the polycarbodiimide (B) are completely melted after heating of the mixture is started is t1 (seconds) and the time required until the melt-kneaded product is taken out after the polyarylene sulfide (A) and the polycarbodiimide (B) are completely melted is t2 (seconds) in step (I-1), the t1 is smaller than t2.

3. A method of producing a carbon fiber-reinforced polyarylene sulfide, comprising:
    (I-2) heating a polycarbodiimide (B) having at least two carbodiimide groups in one molecule at a temperature equal to or higher than the softening point of the component (B) to accelerate reaction of the carbodiimide groups to prepare a polycarbodiimide reaction product (B-2);
    (II-2) mixing 100 parts by mass of a polyarylene sulfide (A) and 0.1 to 10 parts by mass of the polycarbodiimide reaction product (B-2), and heating and melt-kneading the resulting mixture to prepare a polycarbodiimide-modified polyarylene sulfide (C-2); and
    (III-2) melting the polycarbodiimide-modified polyarylene sulfide (C-2), and combining the polycarbodiimide-modified polyarylene sulfide (C-2) with 10 to 300 parts by mass of carbon fibers (D) based on 100 parts by mass of the polyarylene sulfide (A) to prepare a composite,
    wherein step (III-2) impregnates a base material composed of the carbon fibers (D) with the melted component (C-2).

4. The method according to claim 3, wherein, in step (I-2), the temperature equal to or higher than the softening point of the component (B) is 50 to 250° C.

5. The method according to claim 3, wherein, in step (I-2), the time during which the polycarbodiimide (B) is heated at a temperature equal to or higher than the softening point of the component (B) is 1 to 48 hours.

6. A method of producing a carbon fiber-reinforced polyarylene sulfide, comprising:
    (I-3) preparing a mixture by mixing 100 parts by mass of a polyarylene sulfide (A) and 0.1 to 10 parts by mass of a polycarbodiimide (B) having at least two carbodiimide groups in one molecule;
    (II-3) heating and melt-kneading the mixture, at a temperature equal to or higher than the melting point of the polyarylene sulfide (A) to accelerate reaction of the carbodiimide groups to prepare a polycarbodiimide-modified polyarylene sulfide (C-3); and
    (III-3) melting the polycarbodiimide-modified polyarylene sulfide (C-3) at a temperature equal to or lower than the temperature during melt-kneading in step (II-3), and combining the polycarbodiimide-modified polyarylene sulfide (C-3) with 10 to 300 parts by mass of carbon fibers (D) based on 100 parts by mass of the polyarylene sulfide (A) to prepare a composite,
    wherein step (III-3) impregnates a base material composed of the carbon fibers (D) with the melted component (C-3).

7. The method according to claim 6, wherein, in step (II-3), the temperature equal to or higher than the melting point of the polyarylene sulfide (A) is 330 to 400° C., and in step (III-3), the temperature equal to or lower than the temperature during melt-kneading in step (II-3) is 280 to 330° C.

8. The method according to claim 1, further comprising step (IV): heating the composite at a temperature equal to or higher than the glass transition temperature and equal to or lower than the melting point of the polyarylene sulfide (A) to accelerate reaction of the carbodiimide groups in the composite.

9. The method according to claim 1, further comprising step (V): injection-molding or press-molding the composite prepared.

10. The method according to claim 9, wherein the molding processing temperature in injection molding or press molding in step (V) is lower than the temperature in preparation of the composite in step (III-1).

11. The method according to claim 1, wherein the component (D) is surface-treated with a compound (E) having, in one molecule, three or more functional groups of at least one type selected from the group consisting of a carboxyl group, a hydroxyl group and an epoxy group.

12. The method according to claim 3, further comprising step (V): injection-molding or press-molding the composite.

13. The method according to claim 12, wherein the molding processing temperature in injection molding or press molding in step (V) is lower than the temperature in preparation of the composite in step (III-2).

14. The method according to claim 6, further comprising step (V): injection-molding or press-molding the composite prepared in step (III-3).

15. The method according to claim 14, wherein the molding processing temperature in injection molding or press molding in step (V) is lower than the temperature in preparation of the composite in step (III-3).

16. A method of producing a carbon fiber-reinforced polyarylene sulfide, comprising:
(I-1) mixing 100 parts by mass of a polyarylene sulfide (A) and 0.1 to 10 parts by mass of a polycarbodiimide (B) having at least two carbodiimide groups in one molecule, and heating and melt-kneading the resulting mixture to prepare a melt-kneaded product;
(II-1) heating the melt-kneaded product at a temperature equal to or higher than the glass transition temperature and equal to or lower than the melting point of the polyarylene sulfide (A) to accelerate reaction of the carbodiimide groups in the melt-kneaded product to prepare a polycarbodiimide-modified polyarylene sulfide (C-1); and
(III-1) melting the polycarbodiimide-modified polyarylene sulfide (C-1), and combining the polycarbodiimide-modified polyarylene sulfide (C-1) with 10 to 300 parts by mass of carbon fibers (D) based on 100 parts by mass of the polyarylene sulfide (A) to prepare a composite,
wherein, in step (I-1), at least a part of melt-kneading is performed under a reduced-pressure condition of −0.05 MPa or less.

17. A method of producing carbon fiber-reinforced polyarylene sulfide, comprising:
(I-2) heating a polycarbodiimide (B) having at least two carbodiimide groups in one molecule at a temperature equal to or higher than the softening point of the component (B) to accelerate reaction of the carbodiimide groups to prepare a polycarbodiimide reaction product (B-2);
(II-2) mixing 100 parts by mass of a polyarylene sulfide (A) and 0.1 to 10 parts by mass of the polycarbodiimide reaction product (B-2), and heating and melt-kneading the resulting mixture to prepare a polycarbodiimide-modified polyarylene sulfide (C-2); and
(III-2) melting the polycarbodiimide-modified polyarylene sulfide (C-2), and combining the polycarbodiimide-modified polyarylene sulfide (C-2) with 10 to 300 parts by mass of carbon fibers (D) based on 100 parts by mass of the polyarylene sulfide (A) to prepare a composite,
wherein, in step (II-2), at least a part of melt-kneading is performed under a reduced-pressure condition of −0.05 MPa or less.

18. A method of producing a carbon fiber-reinforced polyarylene sulfide, comprising:
(I-3) preparing a mixture by mixing 100 parts by mass of a polyarylene sulfide (A) and 0.1 to 10 parts by mass of a polycarbodiimide (B) having at least two carbodiimide groups in one molecule;
(II-3) heating and melt-kneading the mixture at a temperature equal to or higher than the melting point of the polyarylene sulfide (A) to accelerate reaction of the carbodiimide groups to prepare a polycarbodiimide-modified polyarylene sulfide (C-3); and
(III-3) melting the polycarbodiimide-modified polyarylene sulfide (C-3) at a temperature equal to or lower than the temperature during melt-kneading in step (II-3), and combining the polycarbodiimide-modified polyarylene sulfide (C-3) with 10 to 300 parts by mass of carbon fibers (D) based on 100 parts by mass of the polyarylene sulfide (A) to prepare a composite,
wherein, in step (II-3), at least a part of melt-kneading is performed under a reduced-pressure condition of −0.05 MPa or less.

* * * * *